(12) United States Patent
Alagha

(10) Patent No.: US 7,590,199 B2
(45) Date of Patent: Sep. 15, 2009

(54) HYBRID FREQUENCY OFFSET ESTIMATOR

(75) Inventor: Nader S. Alagha, Montreal (CA)

(73) Assignee: Advantech Advanced Microwave Technologies Inc., Quebec (CA)

( * ) Notice: Subject to any disclaimer, the term of this patent is extended or adjusted under 35 U.S.C. 154(b) by 868 days.

(21) Appl. No.: 10/938,299

(22) Filed: Sep. 10, 2004

(65) Prior Publication Data

US 2005/0058229 A1 Mar. 17, 2005

Related U.S. Application Data

(60) Provisional application No. 60/502,283, filed on Sep. 12, 2003.

(51) Int. Cl.
*H04B 7/10* (2006.01)
*H04L 1/02* (2006.01)

(52) U.S. Cl. ............... 375/347; 375/346; 375/340; 375/324; 375/325; 375/326

(58) Field of Classification Search ............ 375/346, 375/308, 326, 260, 261, 344, 316, 324, 325, 375/340, 347

See application file for complete search history.

(56) References Cited

U.S. PATENT DOCUMENTS

| | | | |
|---|---|---|---|
| 5,640,431 A * | 6/1997 | Bruckert et al. ............. | 375/344 |
| 5,812,611 A * | 9/1998 | Sogabe ....................... | 375/344 |
| 6,002,721 A | 12/1999 | Said et al. | |
| 6,363,084 B1 * | 3/2002 | Dejonghe ................... | 370/480 |
| 6,421,399 B1 * | 7/2002 | Avidor et al. ................ | 375/329 |
| 6,577,271 B1 * | 6/2003 | Gronemeyer ................ | 342/378 |
| 6,868,131 B2 * | 3/2005 | Ohishi ........................ | 375/326 |
| 6,952,440 B1 * | 10/2005 | Underbrink ................ | 375/150 |
| 6,983,134 B1 * | 1/2006 | Asahara et al. ............ | 455/182.2 |

(Continued)

FOREIGN PATENT DOCUMENTS

EP 1 126 673 A2 8/2001

(Continued)

OTHER PUBLICATIONS

Channel Estimation for Ultra-Wideband Communications. Lottici, Vincenzo; D'Andrea, Aldo and Mengali, Umberto. IEEE Journal on Selected Area in Communications, vol. 20, No. 9, Dec. 2002, pp. 1638-1645.

(Continued)

*Primary Examiner*—Jason M. Perilla
(74) *Attorney, Agent, or Firm*—Michael J. Mehrman; Mehrman Law Office P.C.

(57) ABSTRACT

A hybrid carrier frequency offset estimator that uses data-aided and non-data-aided signal processing techniques to produce multiple candidates for the carrier frequency offset within a return channel receiver in a DVB-RCS system using turbo coding and quadrature phase shift keying (QPSK) data modulation. In this system, the invention is employed to estimate signal distortion caused by carrier frequency offset so that this particular source of signal distortion can be removed to improve the ability of the receiver to maintain synchronization in low signal-to-noise conditions. This, in turn, allows the receiver to meet the DVB-RCS performance target, measured in terms of packet loss ratio, in low signal-to-noise ratio conditions and in particular for burst-mode data transmission with a short data packet size.

32 Claims, 14 Drawing Sheets

U.S. PATENT DOCUMENTS

| | | | | |
|---|---|---|---|---|
| 7,002,939 | B1* | 2/2006 | Hiramatsu | 370/335 |
| 7,012,881 | B2* | 3/2006 | Kim | 370/208 |
| 7,023,928 | B2* | 4/2006 | Laroia et al. | 375/260 |
| 7,027,429 | B2* | 4/2006 | Laroia et al. | 370/350 |
| 7,203,244 | B2* | 4/2007 | Alcouffe | 375/260 |
| 7,239,676 | B2* | 7/2007 | Dimsdle | 375/340 |
| 7,254,189 | B1* | 8/2007 | Kazakevich et al. | 375/326 |
| 7,254,194 | B2* | 8/2007 | Lin et al. | 375/345 |
| 7,313,085 | B2* | 12/2007 | Kim | 370/208 |
| 7,315,588 | B2* | 1/2008 | Hessel | 375/340 |
| 2002/0196731 | A1* | 12/2002 | Laroia et al. | 370/206 |
| 2003/0048809 | A1 | 3/2003 | Van Doninck et al. | |
| 2003/0058953 | A1* | 3/2003 | Lee et al. | 375/260 |
| 2003/0123575 | A1* | 7/2003 | Nordman | 375/340 |
| 2003/0128158 | A1* | 7/2003 | Jandrell | 342/357.12 |
| 2003/0142659 | A1* | 7/2003 | Lin et al. | 370/351 |
| 2003/0223513 | A1* | 12/2003 | Norris et al. | 375/336 |
| 2004/0066862 | A1* | 4/2004 | Kim et al. | 375/329 |
| 2004/0109508 | A1* | 6/2004 | Jeon et al. | 375/260 |
| 2004/0190648 | A1* | 9/2004 | Anim-Appiah et al. | 375/324 |
| 2007/0153930 | A1* | 7/2007 | Reid | 375/260 |

FOREIGN PATENT DOCUMENTS

GB   2 338 500 A   11/2003

OTHER PUBLICATIONS

Turbo embedded estimation with imperfect phase/frequency recovery. Cioni, S.; Corazza, G.E. and Coralli, A.V. Communications, 2003. ICC '03. May 11-15, 2003.

Per-Survivor Processing Sequence Detection for DS/CDMA Systems with Pilot and Traffic Channels. Hong, Seung-Chul; Joo, Jung-Suk and Lee, Yong H. IEEE Communications Letters, vol. 5, No. 8, Aug. 2001, pp. 346-348.

D. Rife and R. Boorstyn, "Single-Tone Parameter Estimation from Discrete-Time Observation", IEEE Trans. on Information Theory, vol. IT-20, No. 5, pp. 591-598, Sep. 1974.

M. Morelli, U. Mengali, "Feedforward Carrier Frequency Estimation with MSK-Type Signals", IEEE Comm. Letters, vol. 2, No. 8, Aug. 1998, pp. 235-237.

U. Mengali, M. Morelli, "Data-Aided Frequency Estimation for Burst Digital Transmission", IEEE Transactions on Communications, vol. 45, No. 1, Jan. 1997 pp. 23-25.

M. Luise, R. Reggiannini, "Carrier Frequency Recovery in All-Digital Modems for Burst-Mode Transmission", IEEE Trans. Comm., vol. 43, No. 2/3/4, Feb.-Apr. 1995, pp. 1169-1178.

W. G. Cowley, "Phase and Frequency Estimation for QPSK Packets: Bounds and Algorithms", IEEE Trans. on Communications, vol. 44, No. 1, pp. 26-28, Jan. 1996.

S. Bellini and G. Tartara, "Bounds on Error in Signal Parameter Estimation", IEEE Trans. On Communications, Mar. 1974, pp. 340-342.

N. Alagha, L. Erup "A Hybrid Data-Aided and Non-Data-Aided Carrier Frequency Estimator for Short PSK-Modulated Bursts", 8th Int Wkshp on SPSC, Sep. 24-26, 2003, pp. 227-234.

L. Erup, M. Cote, "A High-Speed, On-Board Multi-Carrier Demodulator for DVB-RCS Applications", Space Communications an International Journal, vol. 17, 2001, pp. 193-202.

F. Adriaensen, W. Steiner, A. Van Doninck, "MF-TDMA Burst Demodulator Design with Pilot-Symbol Asstd Freq. Est.", 8th Intl Wkshp on SPSC, Sep. 24-26, 2003, pp. 272-279.

* cited by examiner

TYPICAL FREQUENCY OFFSET = 1% OF SYMBOL RATE

◄──────── RESULTING PHASE OFFSET = 488% OVER PACKET ────────►

| 48 SYMBOLS | 440 SYMBOLS |

96
SYSTEMATIC BITS
(220 SYMBOLS)

98
PARITY BITS
(220 SYMBOLS)

TYPICAL BASEBAND DATA RATE = 64 KBAUD (64K SYMBOLS/SEC)

TYPICAL FREQUENCY OFFSET = 1% OF SYMBOL RATE = 640 Hz

HYBRID FREQUENCY OFFSET ESTIMATOR

CROSS-REFERENCE TO RELATED APPLICATION

This application claims priority to U.S. Provisional Patent Application Ser. No. 60/502,283 entitled "Joint Synchronization and Decoding of Burst Signals" filed on Sep. 12, 2003, the subject matter of which is incorporated by reference. This application is also related to and incorporates by reference U.S. patent application Ser. No. 10/938,305 entitled "Joint Synchronizer and Decoder," which is commonly owned and concurrently filed with the present application.

TECHNICAL FIELD

The present invention is directed generally to digital signal processing techniques for burst-mode data signals having short observation lengths in an environment experiencing a low signal-to-noise ratio (SNR). The invention is more particularly but not exclusively directed to a hybrid data-aided and non-data-aided (Hybrid DA-NDA) frequency estimator adapted for use in burst-mode phase shift key (PSK) modulation systems based on the Digital-Video Broadcast Return Channel via Satellite (DVB-RCS) Standard.

BACKGROUND OF THE INVENTION

The use of satellites for the transmission of voice and data communication signals has greatly expanded over the past decade, and satellite links are now routinely used and relied upon for global, almost instant, bidirectional communications. Rapid improvements in satellite communications have produced beneficial impacts on many segments of society from business and commercial applications to consumer products. For example, residences throughout the world now receive news and entertainment broadcasts via satellite, in nearly real-time from sites in almost any country.

Burst-mode communication systems and the related synchronization techniques are frequently used in satellite voice and data receivers. These systems typically employ multiple transmitters that send "bursts" of transmissions to a receiver to provide multiple access to many users. Bursts from the different transmitters are coordinated in time and frequency such that each transmitter can communicate with the receiver without interfering with each other. In one type of burst-mode communication, Time Division Multiple Access (TDMA) allows multiple users to share a single carrier wave using time-division multiplexing (TDM) to transmit multiple bursts on that carrier wave. TDM divides the carrier wave into time slots and then allocates those time slots to the different data signals. Effectively, each of the data signals takes turns accessing the carrier wave, thereby allowing a single carrier wave to carry multiple simultaneous data transmission. A Multi-Frequency Time Division Multiple Access (MF-TDMA) receiver simultaneously receives TDMA signals on several different carrier frequencies. In the MF-TDMA data transmission scheme, any user can potentially transmit data at any frequency at any time. The actual time slot and frequency allocation to each user is based on capacity requests submitted by the terminal.

Within the TDMA bursts specified in DVB-RCS Standard, the carrier signal is modulated by data symbols in which a phase characteristic of the symbol represents the data. This type of modulation technique is known as "phase shift keying" (PSK) data modulation. In general, each symbol can be represented as a phasor in which the phase state of the symbol at the correct detection interval, or the relative change in phase from symbol to symbol, represents data. This data, in turn, can be expressed as a corresponding bit or combination of bits in which the number of bits corresponds to the number of possible phase states used for data modulation. For example, in binary phase shift keying (BPSK), each symbol may have one of two phase states (i.e., 0, $\pi$). Each BPSK symbol can therefore represent a single binary digit (bit). In quadrature phase shift keying (QPSK), each symbol may have one of four phase states (i.e., 0, $\pi/2$, $\pi$ and $3\pi/2$). Each QPSK symbol can therefore represent two binary digits. In the general "M" phase shift keying (MPSK), each symbol may have "M" phase states. Each MPSK symbol can therefore represent "n" binary digits, where $M=2^n$.

Typically, MF-TDMA signals are de-multiplexed and re-arranged to form a signal equivalent to a single carrier. The single-carrier data signal is then demodulated to recover the underlying data (transmitted information bits). The demultiplexing and demodulation steps are well known in the field of communications and are the subject of extensive research and development to improve transmission speeds, bandwidth, accuracy, and reliability.

Several satellite data transmission standards have been adopted to harmonize the transmission and reception of satellite communications broadcasts. One known standard adopted in the broadcast of Digital Video Broadcast (DVB) signals is Digital Video Broadcast by Satellite (DVB-S). Standard EN 300 421 of the ETSI (European Telecommunications Standards institute). This standard relates to DVB services and transparent satellite communication systems to provide DVB-S services directly to the user through an integrated receiver/decoder device that is located in the user's home: The versatility of DVB-S in multiplexing permits the use of a transmission capacity encompassing a variety of television service configurations, including sound and data services.

The components of the DVB-S services are transmitted on a TDM carrier wave. For more information on the DVB-S standard, please refer to ETSI publication EN 300 421 V1.1.2 (1997-98), entitled "Digital Video Broadcasting (DVB); Framing structure, channel coding and modulation for 11/12 GHz satellite services," the subject matter of which is hereby incorporated herein by reference.

Satellite broadcasts are also increasingly used for instantaneous two-way audio, video, and data communications. Accordingly, recent attention has been given to the demand for making satellite communications interactive so that recipients of the broadcast can also communicate back to the origin of the transmission. For example, satellite communications can be used to provide Internet connections between different users. In an effort to establish unified bi-directional satellite communications, the digital video broadcast with return channel by satellite (DVB-RCS) standard has been enacted by the ETSI.

The DVB-RCS standard relates to interaction channels on a satellite distribution system. The purpose of this standard is to provide basic specifications for providing interaction channels for interactive networks based on geostationary (GEO) satellites that incorporate return channel satellite terminals (RCST). The DVB-RCS standard facilitates the use of RCSTs for domestic installations both individual and collective types. The DVB-RCS standard likewise supports the connection of the terminals with home data networks, and can be applied to all frequency bands allocated to GEO satellite services. For more information on the DVB-RCS standard, refer to ETSI publication, EN 301 790 v.1.3.1, dated 2003-03, entitled "Digital Video Broadcasting (DVB); Interaction Channel for Satellite Distribution Systems," the subject matter of which is hereby incorporated herein by reference.

Satellite communication systems operating under the DVB-RCS standard can exchange data using a variety of network and Internet technologies. For example, the DVB-RCS standard accommodates Asynchronous Transfer Mode (ATM) technology for transferring data in cells or packets of a fixed size. The data packet used with ATM is relatively small compared to packets used with older technologies. The small, constant packet size allows ATM equipment to transmit video, audio, and computer data over the same network, and assures that no single type of data hogs the line. ATM creates a fixed channel, or route, between two points whenever data transfer begins, unlike TCP/IP that divides messages into packets that can each take a different route from source to destination. Consequently, it is generally easier to track and bill data usage across the ATM network, but the ATM network is less adaptable to sudden surges in network traffic. Similarly, the DVB-RCS standard may be used to transmit MPEGs (Moving Picture Experts Group), a family of digital video compression standards and file formats that achieve high compression rate by storing only the changes from one frame to another, instead of each entire frame.

Loss of bursts (or packets), as measured by packet loss ratio, is a main performance criterion for evaluating the burst-mode data transmission. The typical expected packet loss ratio for traffic bursts over return satellite link is $10^{-7}$ (i.e., one lost packet in ten million). Due to a long propagation delay in Geostationary satellite communications, the packet loss ratio should be low in order to avoid performance degradation at higher network layers. The human senses are generally tolerant of slight variations, so for the transmission of video and sound broadcasts, as defined by DVB-RCS, the packet loss ratios is preferably in the order of $1 \times 10^{-5}$, so that less than one packet is lost per hundred-thousand burst-mode signals.

One way to decrease packet loss is to increase signal transmission strength or effective isotropic radiated power (EIRP) of the transmitter, thereby increasing the signal-to-noise ratio at the receiver. Improvements in the signal-to-noise ratio are desirable because, as provided by Shannon's theorem, the ultimate theoretical limit to the data transmission transfer rate on a communications channel is directly proportional the signal-to-noise ratio of that channel. Consequently, increasing the power transmitted on the return channel can often be a solution to provide adequately reliable communications. However, increasing the transmission power requires the use of more sophisticated equipment, which in turn increases unacceptably the cost of the transmitter. Accordingly, there is a current need for a demodulation technology that allows reliable burst-mode communications at relatively poor channel conditions (low signal-to-noise ratio). More specifically, there is a current need for a demodulation technology that allows for reliable burst-mode data transmission in a DVB-RCS system with sufficiently low packet loss ratio while maintaining or even reducing current terminal transmission power levels in order to minimize the cost of user terminals.

Another important aspect of DVB-RCS system application is the provision of services at $K_a$-band frequencies (e.g., 30 GHz uplink from terminals to satellite). The cost of user terminal plays a major role in the business model of this type of services. RF components of the terminals are costly. Less expensive RF components results in tighter link budget on the uplink from the terminal to satellite. For such users the use of very power efficient modems is essential in order to maintain acceptable level of system availability.

Thus, there exist a further need for a demodulating technology that allows for sufficiently low packet loss ratio for DVB-RCS transmissions with higher power efficiency. As suggested above, numerous technical and physical problems complicate the synchronization in satellite communications. For instance, the synchronization may be difficult where the transmitter and receiver are moving relative to each other. Specifically, when a burst-mode communication transmitter is on or near the earth and the intended receiver is in a satellite (or when a satellite transmits to the terrestrial receiver), the spatial locations and the relative velocities of the transmitter and receiver change over time. The change in spatial location causes the propagation path length and the signal propagation time to change, and the change in relative velocities causes a Doppler frequency to change the frequency of the burst-mode signal when it is received at the intended receiver. As a consequence, the burst-mode signals, originally transmitted at fixed intervals, arrive at varying time intervals. Furthermore, varying weather conditions, such as clouds and rain, also affect the communication signals. There is also certain level of inherent carrier frequency uncertainty at the transmitter output. Overall, these and other conditions cause carrier frequency offset in the burst-mode communication.

These issues are particularly present in DB-RCS communications at $K_a$ band. At a DVB-RCS transmitter output, a 30 GHz carrier will generally appear with some carrier frequency offset $f_o$, or residual error, so that carrier frequency $(f_c) = 30$ GHz $\pm f_o$. The DVB-RCS Standard puts a constraint on the uncertainty in carrier frequency at the output of the transmitter. According to the DVB-RCS Standard, the normalized carrier frequency accuracy should be better than $10^{-8}$. The accuracy is defined in terms of root-mean square error. Carrier frequency variation can be up to 6 times this value. For example, for a $K_a$ band transmitter at 30 GHz carrier, the carrier frequency offset can be in the range of $\pm 1800$ Hz $(30 \times 10^9 \text{ Hz} \times 10^{-8} \times 6 = 1800 \text{ Hz})$.

In addition to the frequency uncertainty caused by the terminal, contributors to the carrier frequency offset include: movement of the satellite (creating Doppler effect), uncertainty due to the satellite's transponder, uncertainty or changes at the transmitter as to the exact carrier frequency, and length and atmospheric conditions en route. These and other contributors in the system deviate the carrier off its nominal value and synchronization is performed to correct for the carrier frequency offset and get the carrier back to its nominal or baseband state. In a sense, synchronization is a fine-tuning value for best receiver performance.

Accordingly, the synchronization process generally includes burst detection, finding the right sampling timing (i.e., the symbol timing), finding the carrier frequency offset, and tracking the carrier phase. After the right combination of these factors is determined, thereby establishing synchronization, then the coherent data symbols of a burst are passed to a decoder to extract and deliver the payload data in the that burst.

Accordingly, in synchronous digital transmission, information is conveyed by uniformly spaced pulses and the function of any receiver is to isolate these pulses as accurately as possible. However, the received signal has undergone changes during transmission due to the noisy nature of the transmission channel, and a complete estimation of certain reference parameters is necessary prior to data detection. Estimation theory proposes various techniques for estimating these parameters depending on what is known of their characteristics. One such technique is called maximum likelihood (ML) estimation. Maximum likelihood estimation assumes the parameters are deterministic or at most slowly varying over the time interval of interest. The term deterministic implies the parameters are unknown but of a constant value and are, therefore, not changing over the observation interval. These unknown parameters can cover such factors as the optimum sampling time, the static phase offset, or carrier frequency offset introduced in the channel or induced by the instabilities of the transmitter and receiver oscillators. It is widely recognized that maximum likelihood estimation techniques offer a systematic and conceptually simple guide to the solution of synchronization problems. Maximum likelihood provides (near) optimum performance depending on the known channel. However, for a general parameter estimation problem, the Maximum likelihood estimator may not exist or the structure of the Maximum Likelihood estimator can be too complex to be implemented in practical systems. In many cases, practical estimators are derived as an approximation of Maximum Likelihood parameter estimators. See, for example, J. G. Proakis, "Digital Communications," Third Edition, McGraw-Hill Publishers, 1995, pp. 333-336.

Synchronization techniques used in communication receivers are typically derided from Maximum Likelihood estimators. For communication receivers, there exist two categories of the parameter estimators, depending on how the data present on the received signal is exploited to assist in parameter estimation. The first is data-aided (DA) parameter estimation, in which known data structure within the received signal is exploited. In DA parameter estimation, known data symbols, such as symbols in the signal header or preamble, are identified and then used to reduce the ambiguity of signal observation in order to obtain more accurate estimation of the desired parameter (e.g., carrier frequency offset, phase offset, symbol timing, etc.). Numerous DA estimation techniques are known. For example, U. Mengali, M. Morelli, Data-Aided Frequency Estimation for Burst Digital Transmission, IEEE Transaction On Communications, Vol. 45, No. 1, January 1997, pp 23-25, introduce a data-aided frequency estimator for burst-mode phase-shift keying (PSK) signals.

Alternatively, non-data-aided (NDA) estimation techniques form parameter estimations without relying on underlying data of modulated signal. NDA estimation is generally possible when the random data is considered a nuisance parameter, which is removed by averaging the received signal over the statistics of the random data. For example, Morelli and Mengali (M. Morelli, U. Mengali, "Feed-forward carrier frequency estimation with MSK-type signals," IEEE Communications Letters, no. 8, August 1998 pp. 235-237) describes a NDA technique for the carrier frequency offset estimation of a minimum-shift keying (MSK)-type modulated signal. The algorithm proposed by Morelli and Mengali has a feedforward structure and is suited for burst-mode transmissions, as described herein. It should be appreciated that numerous NDA parameter estimation techniques for modulated signals are known.

These known parameter estimation techniques usually operate at relatively high signal-to-noise ratio that allow reliable estimates. A proper synchronization of a burst-mode signal is needed to reacquire the transmitted data. In particular, the known burst-mode signal demodulation techniques perform synchronization and then the decoding. As a consequence, the receiver generally includes a cascade of components including a receiving filter, a synchronizer, and a decoded to process received burst-mode signals. Iterative decoding schemes for turbo-coded signals have made it possible to improve the power efficiency of the transmission. However, at low signal-to-noise level, the full coding gain is not achievable due to carrier synchronization errors. For example, in a DVB-RCS return link with short burst size and low coding rate, the error caused by the carrier synchronization degrades the performance significantly. Since the return channel is operating at a very low signal-to-noise ratio, carrier synchronization based on traditional approach cannot alone give the accurate synchronization that is needed for reliable decoding.

A data-aided parameter estimator alone is unable to provide accurate estimate mainly because the number of pilot symbols transmitted in each burst is small. It is desirable to maintain the number of pilot symbols as small as possible since they do not carry any information and are considered as overhead. The non-data aided estimator can potentially use all symbols (pilot symbols and data symbols) for parameter estimation. For a moderate or high level of signal-to-noise, an NDA estimator provides a better performance than a DA estimator since the length of data-symbols is typical many times larger than the number of pilot symbols. However, at low signal-to-noise level, the performance of the NDA estimator is significantly degraded.

The currently known techniques for parameter estimations generally fail to provide reliable estimate when signal-to-noise level is below certain threshold. When falling below the threshold value, the conventional algorithms fail to operate properly. The threshold level depends on the size of data symbols, the type of modulation and the range of the parameter. Unfortunately, the threshold level for frequency estimation of QPSK modulated burst-mode signals can be higher than the operating signal-to-noise level. Much of the current research and development (so far unsuccessful) is directed toward developing techniques to reduce this threshold level.

Theoretical studies can be conducted on existing frequency estimators to determine their fundamental performance level. Such fundamental performance bounds are typically expressed in terms of the mean square error (MSE) of the estimate. It can be shown that the threshold effect of frequency estimate is fundamental. As a result, it is not expected that a conventional DA or NDA frequency estimator be able to provide the accuracy that is required for frequency estimation of QPSK burst-mode signals at low signal-to-noise level.

As a result, there is an on-going need for techniques and systems for detecting and correcting for signal distortion, such as the carrier frequency offset that typically occurs in a burst-format satellite communication systems operating at low signal-to-noise ratio.

SUMMARY OF THE INVENTION

The present invention meets the needs described above in a carrier frequency offset estimator that produces multiple candidates for the carrier frequency offset. These multiple candidates typically represent the relative positions of several of the largest local maxima values in the modulation-free frequency spectrum of the input signal. Producing multiple candidates for the carrier frequency offset allows a decoder to select among the candidates based on decoding success. The performance of the frequency estimator is improved since the underlying coding structure of the data is used to select the carrier frequency offset. This increases the likelihood of selecting the correct carrier frequency offset when the signal-to-noise ratio declines to the point where noise: may introduce an erroneous peak in the modulation-free spectrum and push the genuine peak for example to the second or the third peak position.

As a result, a receiver utilizing this technique can identify the correct carrier frequency offset, and thereby establish synchronization, at a lower signal-to-noise ratio than conventional receivers. This, in turn, allows the transmitter to meet a required performance target (e.g., packet loss ratio) at a lower power level and cost, which is particularly advantageous in a system with price sensitive transmitters such as return channel transmitters in a satellite communication systems operating under the DVB-RCS standard.

The invention may also include a hybrid frequency offset estimator that combines data-aided and non-data-aided processing techniques to estimate the carrier frequency offset. Combining these processing techniques produces successful estimates of the carrier frequency offset even when one technique alone fails to do so. Therefore, the hybrid frequency offset estimator is a further improvement that allows a receiver utilizing this technology to identify the correct carrier frequency offset, and thereby establish synchronization, at a lower signal-to-noise ratio than conventional receivers. The hybrid frequency offset estimator may also produce multiple candidates for the carrier frequency offset.

Generally described, the invention may be implemented as a signal processor that includes a channel observer and a signal distortion parameter candidate-selector. The channel observer obtains channel observations for an input signal that includes distorted data, and the signal distortion candidate indicator processes the channel observations to identify multiple candidates for a parameter associated with the source of signal distortion. Although this parameter is typically associated with the carrier frequency offset in a communication system using a phase shift key modulation, candidates may be identified for other sources of signal distortion in other types of communication systems.

The signal processor may also include a hybrid signal distortion analyzer that includes a data-aided signal distortion analyzer and a non-data-aided signal distortion analyzer. The data-aided signal distortion analyzer processes known data elements in the channel observations to obtain a data-aided signal distortion indicator, and the non-data-aided signal distortion analyzer processes unknown data elements in the channel observations to obtain a non-data-aided signal distortion indicator. A combiner then combines the data-aided and non-data-aided signal distortion indicators to obtained a combined signal distortion indicator. This signal processor may also include a signal distortion candidate selector for processing the combined signal distortion indicator to identify multiple candidates for a parameter associated with the signal distortion, such as the carrier frequency offset.

More specifically described, the invention may be deployed as a signal processor including a channel observer and a frequency estimator. The channel observer receives an input signal propagating at an expected carrier frequency experiencing a carrier frequency offset. This input signal includes a distorted data signal in which modulating data has been influenced by the carrier frequency offset. The channel observer also processes the input signal to obtain channel observations for the data signal. The frequency estimator removes modulation from the channel observations to obtain a modulation-free resultant signal that includes a representation of the carrier frequency offset. The frequency estimator then obtains a frequency spectrum representation of the modulation-free resultant signal and processes this frequency spectrum representation to identify multiple carrier frequency offset candidates. These carrier frequency offset candidates are then passed to a decoder for use in decoding the data signal.

The input signal processed in the manner described above typically includes burst-mode multi-frequency time division multiplexed (MF-TDMA) data in which the data signal is encoded using a quadrature phase shift key (QPSK) modulation technique in accordance with the digital video broadcast return channel via satellite (DVB-RCS) standard. The channel observer typically includes a front-end analog processor operable for amplifying the input signal, down-converting the amplified input signal to obtain an intermediate frequency signal, and filtering the intermediate frequency signal. In addition, the channel observer may include a digital preliminary processor that digitizes a representation of the input signal to obtain a digital MF-TDMA signal. The preliminary processor may also demultiplex the MF-TDMA signal to obtain a concatenated single-channel TDMA signal. The preliminary processor may then detect burst-mode data packets within the single-channel TDMA signal to obtain the channel observations.

The channel observations typically include symbols having phase components carrying the modulating data. In this case, the frequency estimator may identify the carrier frequency offset candidates for the channel observations by identifying the relative positions of several local maxima values in the frequency spectrum representation. The frequency estimator may also include a data-aided processor having a modulation remover that removes data modulation from known symbols within the channel observations by multiplying the known symbols with conjugate representations of the known symbols to cancel phase modulation due to the known symbols. Alternatively or additionally, the frequency estimator may include a non-data-aided processor having a modulation remover that removes data modulation from the unknown symbols by scaling the phase components of the unknown symbols by a modulation index to cancel the phase components of the unknown symbols. In addition, the frequency estimator typically obtains the frequency spectrum representations using a Fast Fourier Transform (FFT) technique.

For a signal processor including hybrid frequency estimator having data-aided and a non-data-aided processors, the data-aided and non-data-aided frequency spectrum representations are typically converted to a LOG domain, scaled, and summed to obtain the frequency spectrum representation of the modulation-free resultant signal. Preferably, the data-aided and non-data-aided frequency spectrum representations may be independently scaled to allow adjustment within the frequency estimator. In addition, the scaling factor for either the data-aided or the non-data-aided processor may be set to zero, which allows the signal processor to switch between purely data-aided, purely non-data-aided, and hybrid processing modes.

In the hybrid frequency estimator, the data-aided and non-data-aided processors are frequency aligned to facilitate combining the data-aided and non-data-aided frequency spectrum representations. Specifically, the data-aided processor typically includes a modulation remover that removes data modulation from known symbols within the channel observations by multiplying the known symbols in the channel observations with conjugate representations of the known symbols to cancel the phase components of the known symbols, and the non-data-aided processor includes a modulation remover that removes data modulation from the unknown symbols within the channel observations by scaling the phase components of the unknown symbols by a modulation index to cancel the phase components of the unknown symbols.

In addition, the data-aided and non-data-aided processors each typically include a pre-transform processing filter. These pre-transform processing filters are cooperatively configured to remove the effect of the modulation index and thereby align the data-aided and non-data-aided frequency spectrum representations of the channel observations. For example, the data-aided pre-transform processing filter may include a data-aided decimation filter operating a data-aided decimation rate, and the non-data-aided pre-transform processing filter may include a non-data-aided decimation filter operating a non-data-aided decimation rate. To align the data-aided and non-data-aided frequency spectrum representations of the channel observations, the non-data-aided decimation rate is substantially equal to the data-aided decimation rate multiplied by the modulation index.

It should be appreciated that the ability of the signal processor to produce multiple candidates for the carrier frequency offset, and the ability of the signal processor to implement a hybrid data-aided and non-data-aided carrier frequency offset estimator, are features of the invention that may be deployed independently or in combination. In addition, the invention may be practiced within an apparatus, method, software program or data signal incorporating the features of the invention. The invention may also be practiced in new equipment or as an improvement to an existing equipment.

Other features and advantages of the present invention will be readily appreciated upon review of the following detailed description when taken in conjunction with the accompanying drawing figures.

DETAILED DESCRIPTION OF THE PREFERRED EMBODIMENTS

Figure 1:
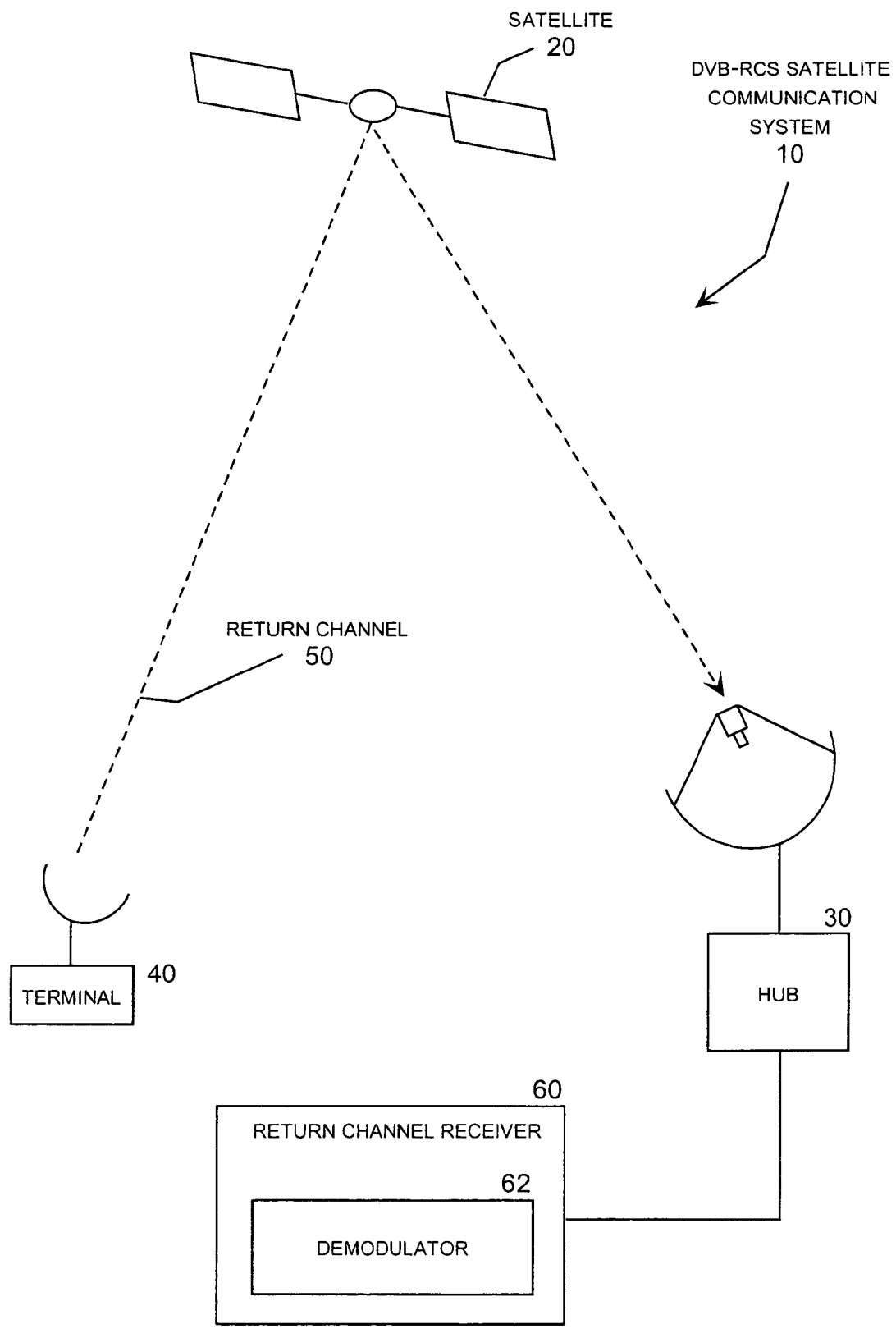
FIG. 1 is a block diagram of a satellite communication system in which the present invention may be deployed.

The present invention is shown in the accompanying figures and described below as a hybrid carrier frequency offset estimator within a return channel receiver in a DVB-RCS system using turbo coding and quadrature phase shift key (QPSK) data modulation. In this system, the invention is employed to estimate signal distortion caused by carrier frequency offset so that this particular source of signal distortion can be removed to improve the ability of the receiver to maintain synchronization in low signal-to-noise conditions. This, in turn, allows the receiver to meet the DVB-RCS performance target without increasing the transmission power of the return channel transmitter. Of course, carrier frequency offset is an important source of signal distortion in any communication system using a phase shift keying modulation technique because the carrier frequency offset directly influences the phase characteristic of the modulating signal. Nevertheless, it should be appreciated that the invention may be applied to the identification and removal of other types of signal distortion that may be more significant in other types of modulation systems, such as amplitude modulation.

It should also be appreciated that the invention may be applied to the identification and removal of other types of signal distortion, such as symbol timing offset, static phase offset, phase noise parameters or the combination of phase noise parameters and carrier frequency offset, in a return channel receiver operating in accordance with the DVB-RCS standard. Accordingly, it should be understood that carrier frequency offset estimation is one important application of the invention, but that it may also be used to estimate other types of signal distortion parameters, and may be used for modulation systems other than phase shift keying.

Similarly, the embodiments of the invention are described below in the context of a return channel receiver operating in accordance with the DVB-RCS standard, but may operate under other standards. Furthermore, the invention is shown as operating in the return channel receiver of a ground-station hub of within a "bent pipe" satellite communication system, which is an important application of the invention. But the invention may also be deployed as on-board processing (OBP) on the satellite or other communication platform, such as an airplane, missile or spacecraft. Embodiments of the invention may also be deployed in a terminal-to-terminal "mesh" communication system, or in any other suitable type of communication system.

The DVB-RCS standard relies on MF-TDMA burst-mode, packetized communications using quadrature phase shift key (QPSK) data modulation. Within this system, individual data packets are turbo encoded and include known symbols in a 48 preamble symbols, and include encoded data symbols in 440 unknown symbols. The symbol length corresponds to 440 bits of information data and rate ½ encoding. It should be understood that these parameters may all be varied for embodiments of the invention utilizing different communication techniques. In particular, known symbols, also referred to as "pilot" symbols, need not be located with a data packet preamble, but may be located anywhere within, and may be distributed throughout, the data packet.

At present, an important purpose for deploying an embodiment of the invention is to minimize the required return channel transmission power required to maintain acceptable packet loss ratio for a satellite communications system under the DVB-RCS standard.

In addition, signal distortion indicators, such as carrier frequency offset candidates, determined by embodiments of the present invention are preferably delivered to a particular embodiment of a decoder-assisted synchronizer as described in U.S. patent application Ser. No. 10/938,305 entitled "Joint Synchronizer and Decoder," which is incorporated herein by reference. Nevertheless, it should be appreciated that the signal distortion indicators could be delivered to any other suitable type of device. Further, the signal distortion estimator and the data decoder may be integrated into a single piece of equipment or they may be distributed. For example, the signal distortion estimator may be located on a satellite as on-board-processing (OBP) equipment, whereas the data decoder may be located in ground-based receiver configured as customer premises equipment (CPE). Of course, any other division of data processing functionality may be deployed to suit a particular application.

It should also be appreciated that carrier phase and frequency synchronization is but one kind of synchronization, and that turbo decoding is but one kind of decoding scheme that may be applied to burst-mode signals. Thus, the particular architecture described, while presented as applied to a DVB-RCS system using these technologies, is not limited to DVB-RCS and has application in other systems faced with the same or similar types of problems. Also, the invention can be applied to any type of turbo decoding principle but is not limited to turbo decoding nor to any particular type of turbo decoding. The method described can be used for different types of coding; likewise, while the embodiment discussed is that of a carrier synchronization, this again is but one part of "synchronization," and the idea can also be generalized so that for any particular part of synchronization that is lacking the necessary performance, the joint collaboration between decoding and synchronization of this invention can be equally applied.

Also, regardless of the type of synchronization and signals being decoded, the method taught does apply to signals in every instance. For example, an embodiment of the invention may be applied to a continuous mode of data transmission. The principles of the invention taught herein with respect to burst-mode signals may also find application to other types of transmissions and the described method and structure is not to be taken as necessarily limiting in this regard. Nevertheless, it should also be appreciated that the problem sought to be overcome by the invention occurs when there are very short observations of the signal, which occurs with a TDMA burst-mode type of signal. This is when joint synchronization and decoding come into the picture most acutely.

The present invention can be applied with purely data-aided signal processing, purely non-data-aided signal processing, or with combined (hybrid) data-aided and non-data-aided signal processing. In particular, embodiments of the invention may combine these data-aided and non-data-aided signal processing techniques to give an enhanced performance that has heretofore not been achieved. Theoretical studies show that existing demodulator systems actually perform very close to the theoretical bounds or thresholds for purely data-aided signal processing and purely non-data-aided signal processing systems. Accordingly, improved results cannot be readily obtained by applying data-aided or non-non-data-aided techniques more rigorously. Instead, the invention obtains improved results by combining the data-aided and non-data-aided features under one umbrella to realize significant improved performance for short burst-mode signals. This hybrid data-aided and non-data-aided frequency estimator therefore uses the beneficial parts of both models, both in the data-aided domain and non-data-aided domain, and combines the results to achieve improved performance and reduce the error of a carrier frequency estimator. This novel frequency estimator design therefore gives an improvement in the carrier frequency synchronization of burst-mode signals, but it is only one component, or building block, in achieving the total joint synchronization and decoding that is actually realized through the combination of the improved frequency offset estimator and the joint synchronizer and decoder.

Although the invention's carrier frequency offset estimator implements this hybrid use of the data-aided and non-data-aided models, other aspects of the invention's overall improved joint synchronization and decoding are applicable to a pure non-data-aided demodulation, or a pure data-aided demodulation. As shown in the embodiments described below, the carrier frequency offset estimator module and the joint synchronization and decoder module conveniently interface at the output of the frequency offset estimator module, which typically, outputs several candidate values for the carrier frequency offset. The number of candidates produced by the carrier frequency offset estimator could be any number the designer chooses, realizing that the system complexity grows with an increase in this number. Three candidates are used in the exemplary embodiments. However, any number of candidates could produced depending on the particular application of the invention.

Referring now to the figures, in which like numerals refer to like elements throughout the several figures, FIG. 1 is a block diagram of a "bent pipe" satellite communication system 10 in which the present invention may be deployed. This type of satellite communication system includes a satellite 20, a number of ground station hubs represented by the hub 30 and a larger number of end-user terminals represented by the terminal 40. For example, this simplified configuration is typical of satellite-based broadcast television systems in which the hub 30 broadcasts television signals to the terminal 40 under the DVB-S standard. As noted previously, it is also advantageous to use this infrastructure for bidirectional communications under the DVB-RCS standard, for example to implement interactive television or Internet service for the receivers. For this application, the terminal 40 typically sends return channel communications 50 back to the hub 30, which includes a return channel receiver 60 configured to receive and decode these communications. The invention may be embodied within a demodulator 62, deployed within the return channel receiver 60.

The DVB-RCS standard specifies the signal structure of the return channel communications 50, which are in multi-frequency time division multiple access (MF-TDMA) burst-mode packet format using quadrature phase shift key (QPSK) data modulation. The DVB-RCS standard includes turbo coding schemes as one possible forward error correction scheme to protect the information data. The corresponding encoded data is decoded using turbo decoding techniques, which are well known in the field of satellite communications. In this system, the present invention may be embodied as a frequency offset estimator within the demodulator 62. The challenge is to reliably determine the carrier frequency offset in return channel signal 50, and thereby allow the return channel receiver 60 to maintain synchronism with the return channel. In particular, the objective includes meting typical DVB-RCS packet loss criteria of $1\times10^{-5}$ (less than one packet is lost per hundred-thousand bursts) and $1\times10^{-7}$ (less than 1 packet is lost per ten million packet transmissions), as appropriate, without having to increase the return channel transmission power of the terminal 40. This objective becomes increasingly challenging as the signal-to-noise ratio decreases (i.e., the return channel signal 50 becomes increasingly faint). The faint return signal problem can be compounded when conditions cause the carrier frequency offset to fluctuate, which can occur, for example, due to the phase noise introduced by RF components at the transmitter or receiver.

Figure 2:
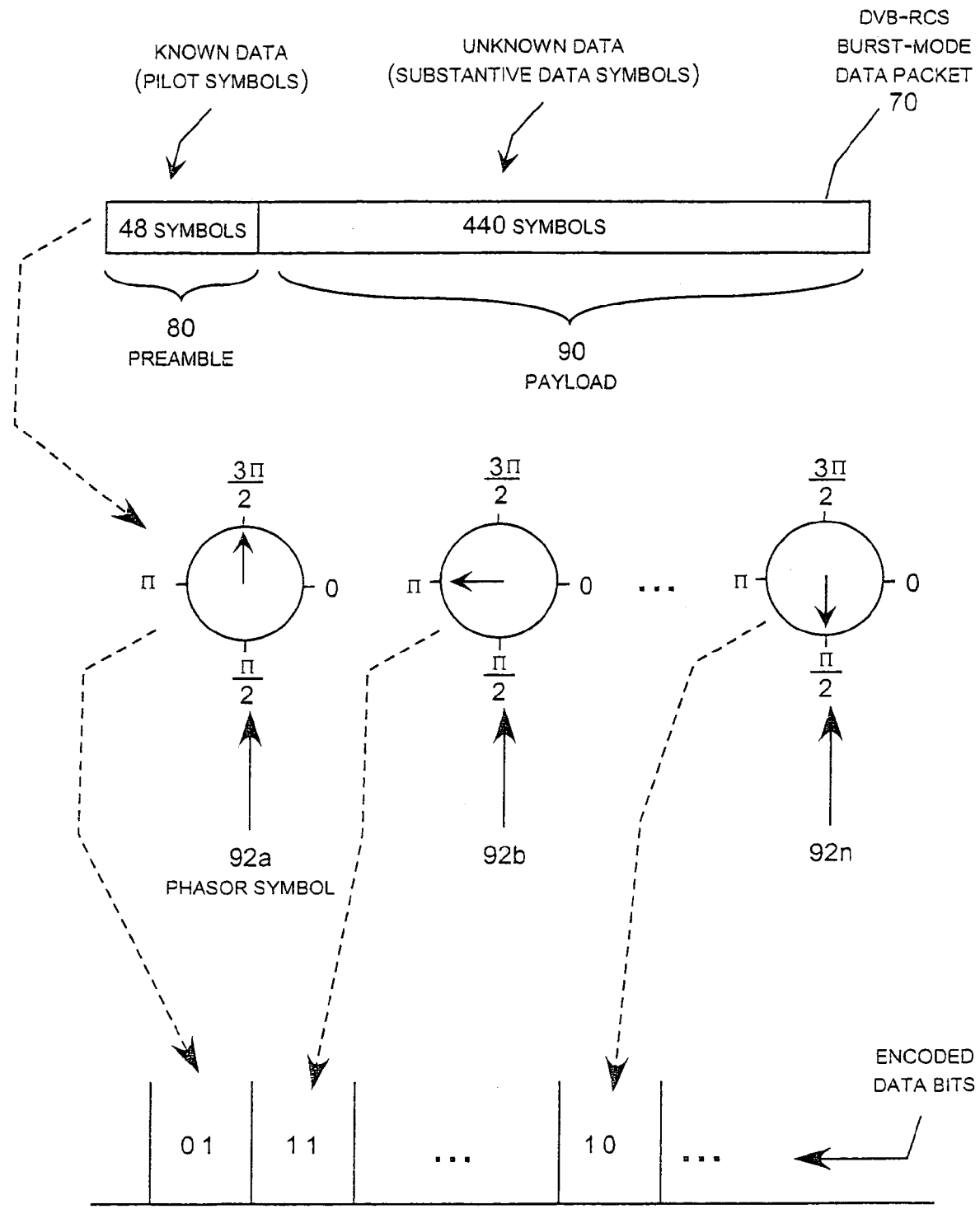
FIG. 2 is a conceptual drawing of a burst-mode data packet illustrating quardature phase shift keying as a data modulation technique.

FIG. 2 is a conceptual drawing of a burst-mode data packet 70 illustrating the quadrature phase shift keying (QPSK) data modulation specified by the DVB-RCS standard. The data packet 70 includes a 48 symbol preamble 80 followed by a 440 symbol payload 90. The preamble 80 includes pilot symbols, which are known data specified in advance and known by the receiver. In general, any number of pilot symbols may be located anywhere or distributed throughout the data packet 70, but the DVB-RCS standard specifies pilot symbols located in a preamble 80 of the data packet. This known data is typically used for burst detection, timing synchronization, phase estimation and so forth. The payload 90 includes the unknown data of the underlying, substantive data transmission. The symbols of the payload 90 may also include substantive data as well as error checking or other bits used for administration of the system. In particular, the payload 90 under the DVB-RCS standard includes "systematic bits" defining substantive data as wells as "parity bits" used for error checking.

As illustrated in FIG. 2, each symbol in the data packet 70 is a phasor, represented by the phasors 92a-n, in which modulating data is expressed as the symbol phase angle. Under the QPSK data modulation technique, each symbol may have four states (i.e., 0, π/2, π and 3π/2). Thus, each symbol can carry two binary digits. For the BSPK data modulation technique, each symbol may have two states (i.e., 0, π) and can therefore carry a single bit. For the generalized MSPK data modulation technique, each symbol may have "M" states and can therefore carry "n" bits where $M=2^n$. The symbols are generally represented by the designation Z(n), and a sample or measurement of the symbol is generally referred to as a "channel observation" represented by the designation Z'(n). That is, the nominal, intended or undistorted baseband data signal is generally represented by the designation Z(n), whereas the actual channel observation distorted (for example as distorted by the carrier frequency offset) is generally represented by the designation Z'(n). The signal processing operation of the frequency estimator can, therefore, be expressed as selecting candidates for the carrier frequency offset based on channel observations Z'(n) so that after performing channel observation corrections, the channel observations become more similar to the baseband data signal Z(n).

Figure 3:
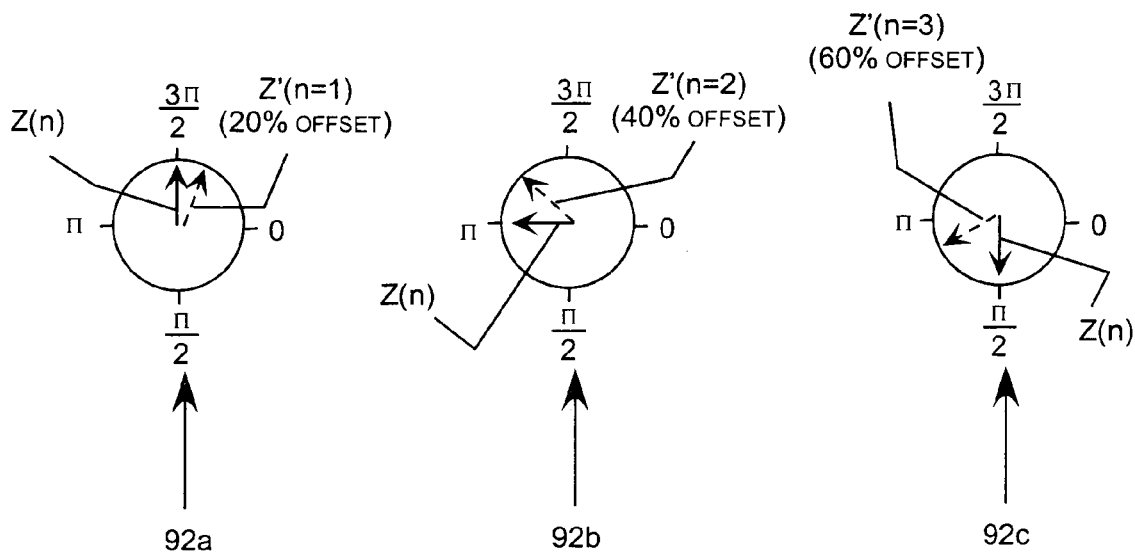
FIG. 3 is a conceptual drawing of data symbols illustrating the signal distortion effect of a carrier frequency offset.

FIG. 3 is a conceptual drawing of data symbols illustrating the signal distortion effect of a carrier frequency offset. Specifically, the carrier frequency offset causes the symbol phase angle to be offset (rotated) slightly from its nominal or expected value. The carrier frequency offset is generally normalized to the symbol rate. For a one percent (1%) carrier frequency offset, for example, the symbol phase angle is offset by one percent of 360° or 3.6°. A frequency offset accumulates in phase over time, which causes the phase offset within a data packet to increase from symbol to symbol. For example, a one percent (1%) carrier frequency offset will cause the symbol phase angle error to rotate around a complete 360° cycle every 100 symbols (considering that all symbols carry identical bits). For a data packet of 488 symbols, this translates into 4.88 complete cycles of phase error over the data packet, which makes the underlying impossible to demodulate unless the carrier frequency offset is detected and removed from the input signal.

Figure 4:
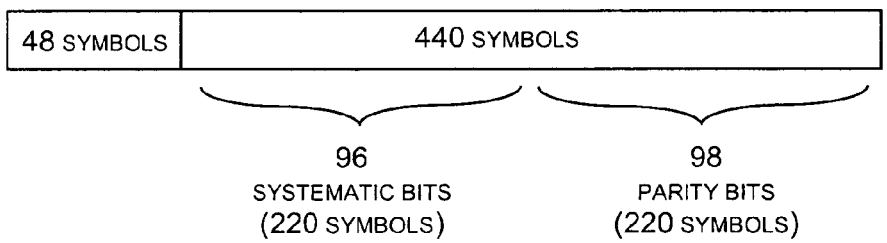
FIG. 4 is a conceptual drawing of a burst-mode data packet illustrating a measure for carrier frequency offset.

FIG. 4 is a conceptual drawing of a burst-mode data packet illustrating a measure for carrier frequency offset. A typical baseband data rate for the data packet 70 is 64 kbaud (i.e., 64,000 symbols per second). For a one percent (1%) carrier frequency offset, this translates into a 640 Hz carrier frequency offset (i.e., 0.01×64,000=640 Hz). This is the signal distortion parameter that the frequency offset estimator of the present invention is designed to detect for removal by a downstream decoder-assisted synchronizer. In order to increase the likelihood of selecting the right carrier frequency offset estimate, the frequency-offset estimator typically provides several candidates. A decoder-assisted synchronizer relies on the decoding success measure to select the correct candidate. In the particular embodiment described in more detail below, the carrier frequency offset is the signal distortion parameter for which the carrier frequency offset estimator produces three candidate values using a hybrid data-aided and non-data-aided signal processing technique.

Figure 5:
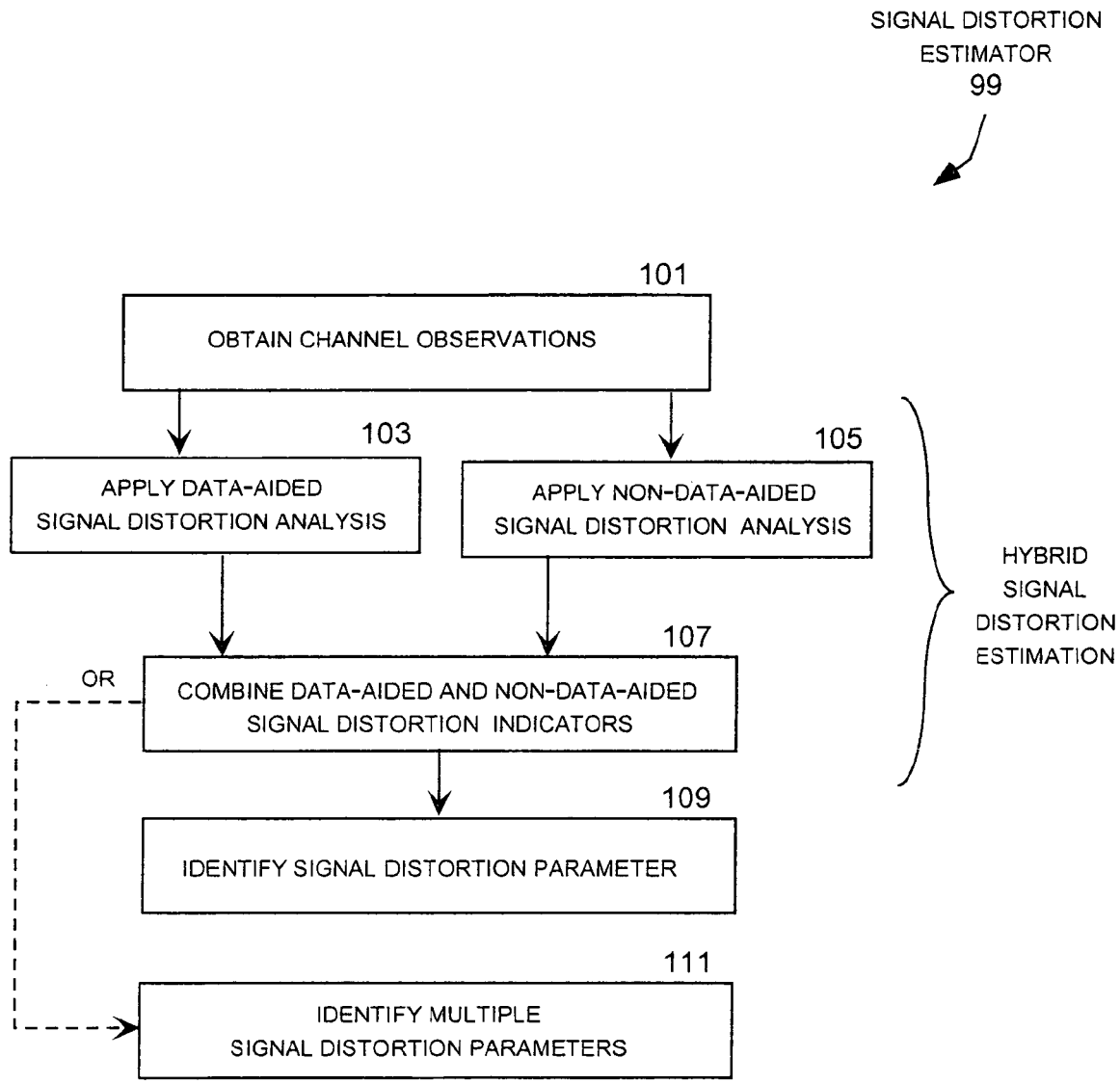
FIG. 5 is a logic flow diagram illustrating a method for operating a generalized signal distortion estimator.

However, the techniques identified above, including (i) producing multiple signal distortion estimates, and (ii) using a hybrid signal processing technique, may be applied independently or in combination. This is illustrated in FIG. 5, which is a logic flow diagram illustrating a method 99 for operating a generalized signal distortion estimator. In step 101, the signal distortion estimator obtains channel observations [Z'(n)] that include underlying data influenced by some type of signal distortion. Step 101 is followed by steps 103 and 105 in parallel, in which the signal distortion estimator applies data-aided signal distortion analysis (step 103) and non-data-aided signal distortion analysis (step 105) to the channel observations. Alternatively, steps 103 and 105 may be performed in serial with either step performed before the other. Steps 103 and 105 are followed by step 107, in which the signal distortion estimator combines a data-aided signal distortion indicator obtained from the data-aided signal distortion analysis (step 103) with a non-data-aided signal distortion indicator obtained from the non-data-aided signal distortion analysis (step 105). Step 107 may be followed by step 109, in which the signal distortion estimator identifies a single signal distortion parameter based on the data-aided signal distortion non-data-aided signal distortion indicators.

Alternatively, as indicated by the dashed arrow, step 107 may be followed by step 111, in which the signal distortion estimator identifies multiple candidates for the signal distortion parameter based on the data-aided signal distortion non-data-aided signal distortion indicators. In addition, steps 103, 105 and 107 represent a hybrid data-aided and non-data aided signal distortion estimation block. As an alternative, the hybrid data-aided and non-data aided signal processing block may be replaced by a purely data-aided signal processing block or a purely non-data aided signal processing block. Further, either of these non-hybrid signal processing blocks may be followed by step 111, in which the signal distortion estimator identifies multiple candidates for the signal distortion parameter a non-hybrid signal distortion indicators. In other words, the techniques identified above, including (i) producing multiple signal distortion estimates [step 111], and (ii) using a hybrid signal processing technique [steps 103, 105 and 107], may be applied independently or in combination.

Figure 6:
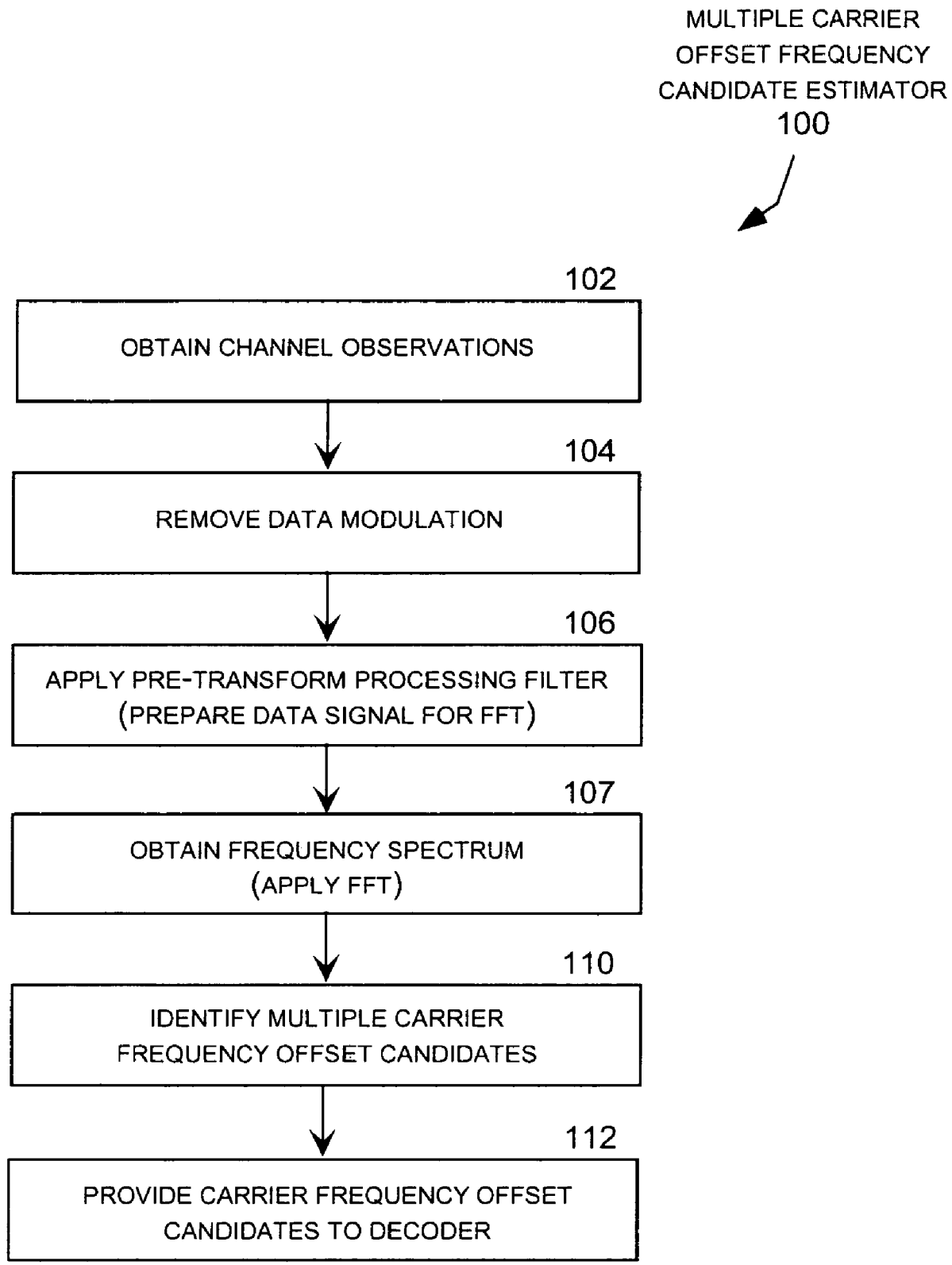
FIG. 6 is a logic flow diagram illustrating a method for operating a carrier frequency offset estimator to produce multiple carrier frequency offset candidates.

FIG. 6 is a logic flow diagram illustrating a method 100 for operating a carrier frequency offset estimator to produce multiple carrier frequency offset candidates. In step 102, the carrier frequency offset estimator obtains a channel observation signal [Z'(n)] from an input signal. The channel observation signal includes underlying data influenced by carrier frequency offset. Step 102 is followed by step 104, in which the carrier frequency offset estimator removes data modulation from the channel observation signal to obtain a modulation-free resultant signal, in this example a modulation-free representation of the channel observation signal. It should be appreciated that removing the data modulation from the channel observation signal will remove the baseband data signal and leaves behind a modulation-free resultant signal that includes only the noise and signal distortion, in this example the carrier frequency offset. This modulation-free resultant signal can then be subjected to frequency spectrum analysis to detect a signal distortion indicator, in this example an indicator of the carrier frequency offset. Because this carrier frequency offset indicator may be masked by noise when the signal-to-noise ratio in the channel observation signal is low, the carrier frequency offset estimator obtains several candidates for the carrier frequency offset, as described below.

Step 104 is followed by step 106, in which the carrier frequency offset estimator applies a pre-transform processing filter to the resultant signal (in this example the modulation-free resultant signal) to prepare this signal for frequency spectrum analysis. Step 106 is followed by step 107, in which the carrier frequency offset estimator obtains a frequency spectrum for the modulation-free resultant signal, typically by passing the signal through a Fast-Fourier Transform (FFT) module. Step 107 is followed by step 110, in which the carrier frequency offset estimator analyzes the frequency spectrum of the modulation-free resultant signal to identify multiple candidates for the carrier frequency offset. For example, the signal distortion estimator may obtain the candidates by identifying several local maxims values in the modulation-free resultant signal, which may involve interpolating the actual data values of the modulation-free resultant signal to obtain a smooth curve in the regions of the local maxima values. Step 110 is followed by step 112, in which the carrier frequency offset estimator provides the candidates of the carrier frequency offset to a decoder for use in synchronizing to the input signal, demodulating it, and decoding the embedded data.

Figure 7:
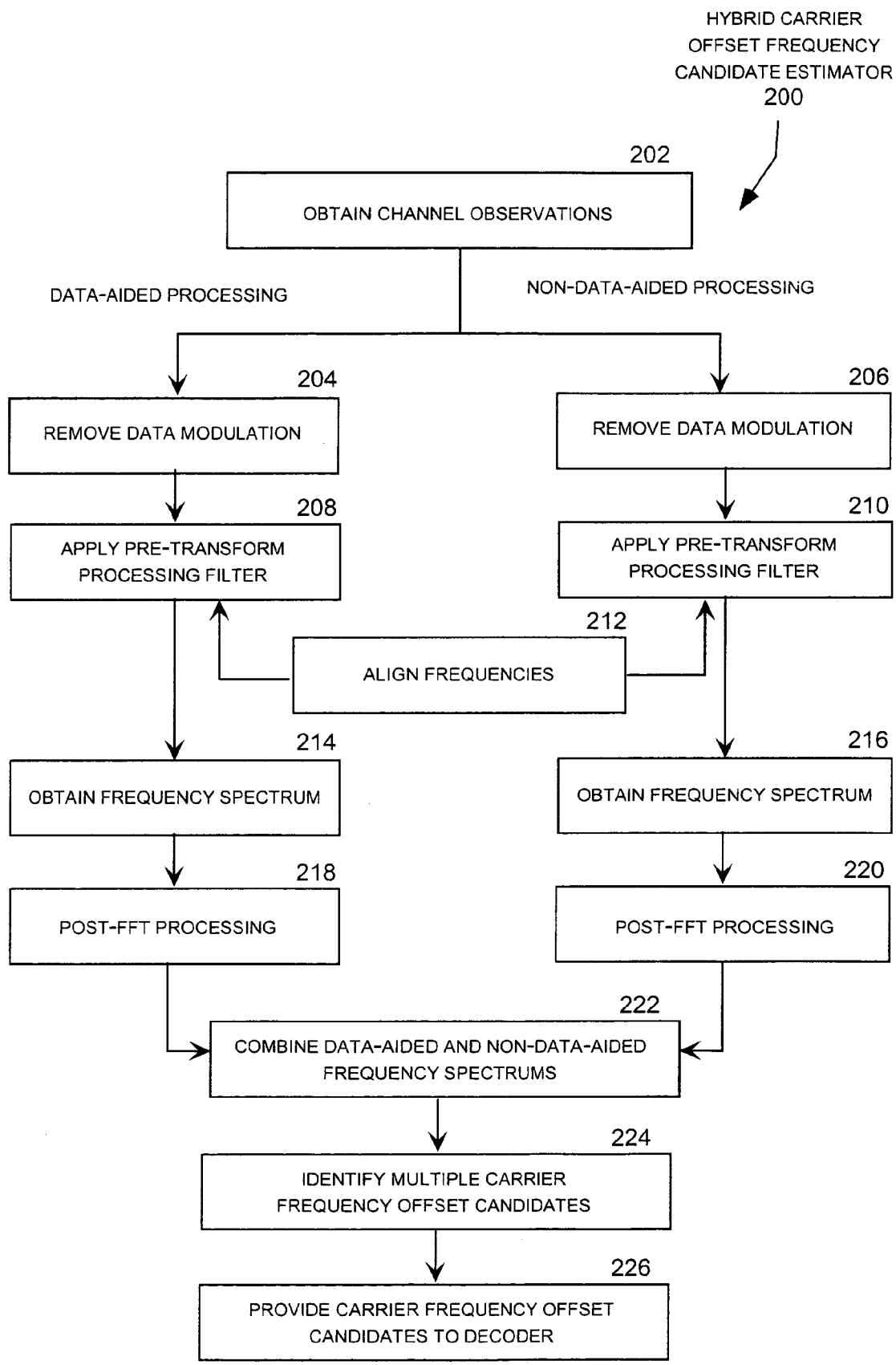
FIG. 7 is a logic flow diagram illustrating a method for operating a hybrid carrier frequency offset estimator.

FIG. 7 is a logic flow diagram illustrating a method 200 for operating a hybrid carrier frequency offset estimator. In step 202, the carrier frequency offset estimator obtains a channel observation signal [Z'(n)] from an input signal. Again, the channel observation signal includes underlying data influenced by some type of signal distortion. Step 202 is followed by two branches, a data-aided processing branch and a non-data-aided processing branch. In the data-aided processing branch, step 202 is followed by step 204, in which the hybrid carrier frequency offset estimator removes modulation from the known symbols in the channel observation signal to obtain a modulation-free data-aided resultant signal. Step 204 is followed by step 208, in which the hybrid carrier frequency offset estimator applies a pre-transform processing filter to the modulation-free data-aided resultant signal.

In the non-data-aided processing branch, step 202 is followed by step 206, in which the hybrid carrier frequency offset estimator removes modulation from the unknown symbols (or all of the symbols in the data packet, including both the known and unknown symbols) in the channel observation signal to obtain a modulation-free non-data-aided resultant signal. Step 206 is followed by step 210, in which the hybrid carrier frequency offset estimator applies a pre-transform processing filter to the modulation-free non-data-aided resultant signal. Steps 208 and 210 are cooperatively configured to align the frequencies of the modulation-free data-aided and non-data-aided resultant signals. In particular, frequency distortion imparted into the modulation-free non-data-aided resultant signals during the modulation removal process is preferably removed at this point through coordination configuration of the pre-transform processing filters applied in steps 208 and 210.

In the data-aided processing branch, step 208 is followed by step 214, in which the hybrid carrier frequency offset estimator obtains a frequency spectrum for the data-aided modulation-free resultant signal, typically by passing the signal through a Fast-Fourier Transform (FFT) module, to obtain a data-aided signal distortion indicator, in this example a frequency spectrum representing a data-aided carrier frequency offset indicator. Step 214 is followed by step 218, in which the hybrid carrier frequency offset estimator applies post-FFT processing to the data-aided carrier frequency offset indicator to facilitate combining this parameter with a non-data-aided carrier frequency offset indicator.

In the non-data-aided processing branch, step 210 is followed by step 216, in which the hybrid carrier frequency offset estimator obtains a frequency spectrum for the non-data-aided modulation-free resultant signal, typically by passing the signal through a Fast-Fourier Transform (FFT) module, to obtain a frequency spectrum representing a non-data-aided carrier frequency offset indicator. Step 216 is followed by step 220, in which the hybrid carrier frequency offset estimator applies post-FFT processing to the non-data-aided carrier frequency offset indicator to facilitate combining this parameter with the data-aided carrier frequency offset indicator. Steps 218 and 220 are followed by step 222, in which the hybrid carrier frequency offset estimator combines the data-aided carrier frequency offset indicator and the non-data-aided carrier frequency offset indicator, in this case a combined frequency spectrum.

Step 222 is followed by step 224, in which the hybrid carrier frequency offset estimator analyzes the combined frequency spectrum to identify multiple candidates for the carrier frequency offset. Specifically, the hybrid carrier frequency offset estimator may obtain the candidates by identifying several local maximum values in the combined frequency spectrum, which may involve interpolating the actual combined frequency spectrum signal to obtain a smooth curve representing the combined frequency spectrum signal in the regions of the local maxima values. Step 224 is followed by step 226, in which the hybrid carrier frequency offset estimator provides the candidates of the carrier frequency offset to a decoder for use in synchronizing to the input signal, demodulating it, and decoding the embedded data.

Figure 8:
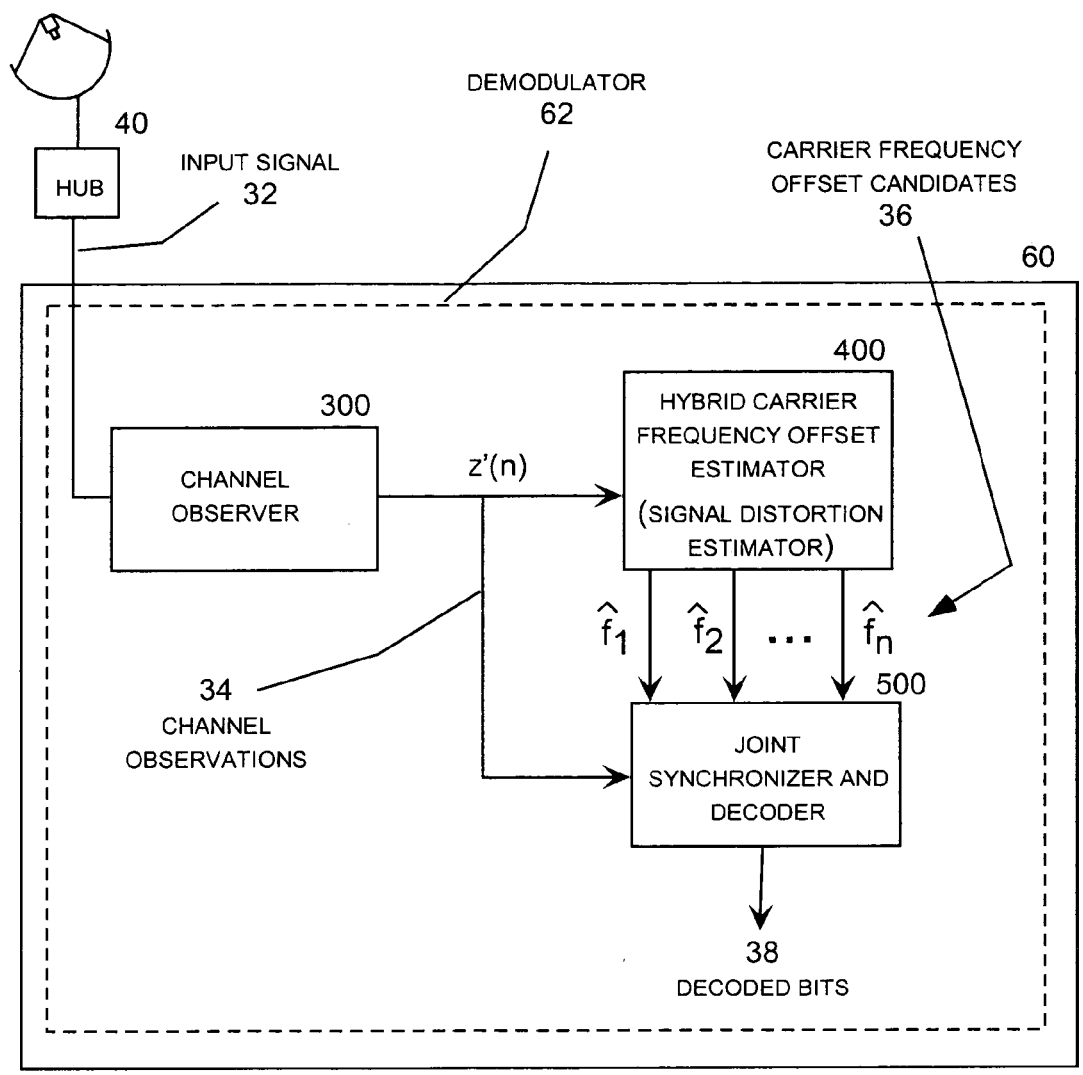
FIG. 8 is a block diagram of a return channel receiver in a satellite communication system including a hybrid carrier frequency offset estimator.

FIG. 8 is a block diagram of the return channel receiver 60 within the satellite communication system 10 shown on FIG.

1. The demodulator 62 in this particular embodiment includes a channel observer 300 that receives the analog input signal from the antenna of the satellite hub 30. The channel observer 300 extracts a channel observation 34 [Z'(n)] from the input signal. As noted previously, the channel observation contains the data symbols as distorted by the carrier frequency offset. The channel observer 300 provides the channel observation to a hybrid frequency offset estimator 400 and to a joint synchronizer and decoder 500. The hybrid frequency offset estimator 400 also provides multiple carrier frequency offset candidates 36 to a joint synchronizer and decoder 500, in which the decoder uses the carrier frequency offset candidates 36 provided by the hybrid frequency offset estimator 400 to synchronize with the channel observation signal and decode this signal to produce decoded bits 38 with increased reliability in a low signal-to-noise environment.

The hybrid frequency offset estimator 400 is described in detail below, whereas the joint synchronizer and decoder 500 is described in commonly owned and concurrently filed U.S. patent application Ser. No. 10/938305 entitled "Joint Synchronizer and Decoder," which is incorporated herein by reference. As noted previously, cooperative operation with the joint synchronizer and decoder 500 is one particular application of the hybrid frequency offset estimator 400, which could alternatively provides its output candidates to any suitable device for subsequent processing.

Figure 9:
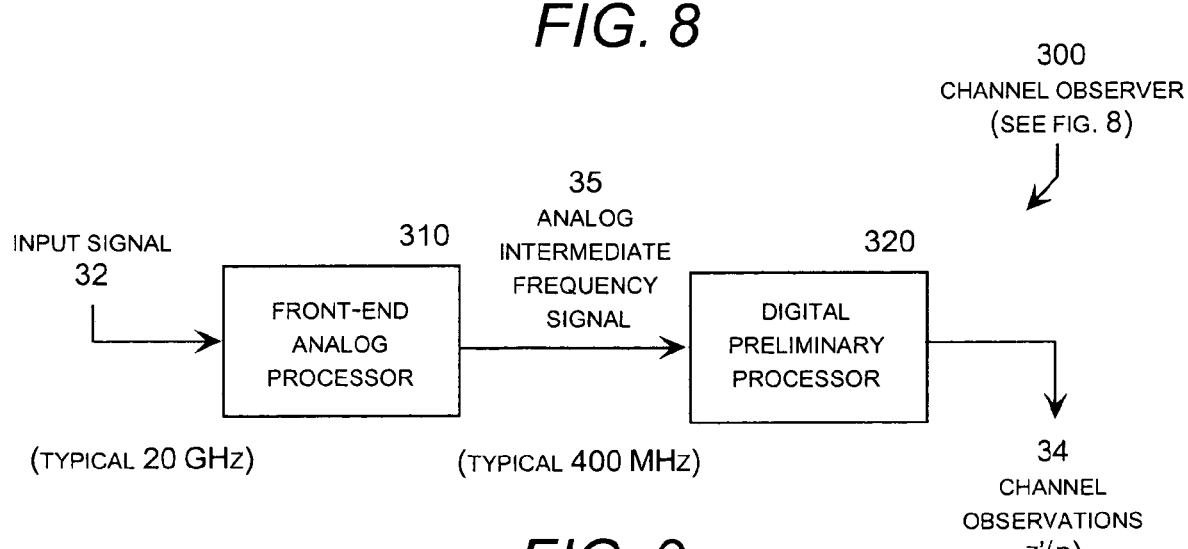
FIG. 9 is a block diagram of a channel observer in a signal processor including a hybrid carrier frequency offset estimator.

FIG. 9 is a block diagram of the channel observer 300, which is part of the hybrid frequency offset estimator 400 shown in FIG. 8. The channel observer 300 includes an analog front-end processor 310 and a digital preliminary processor 320, which are both conventional in design. Briefly described, the analog front-end processor 310 converts the analog input signal 32, typically a Ku or Ka band signal (e.g., 11 or 20 GHz) to an intermediate frequency signal 35 (e.g., 400 MHz) that is suitable for processing in conventional solid state hardware. The digital preliminary processor 320 digitizes the intermediate frequency signal 35 to produce the channel observation signal 34.

Figure 10:
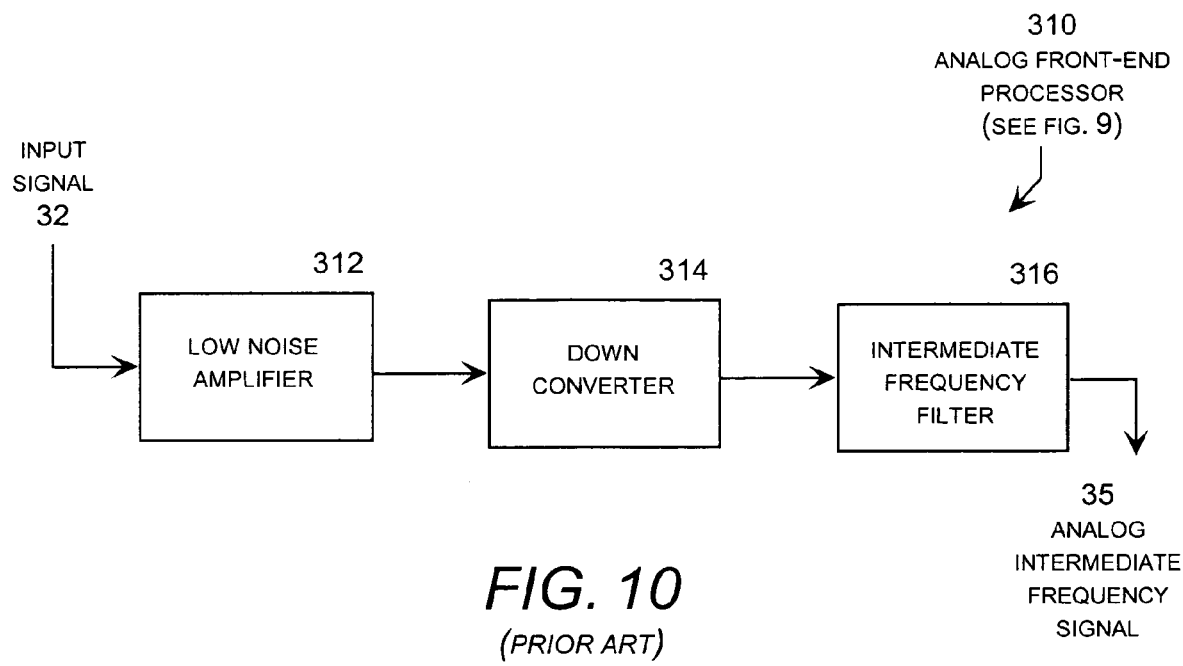
FIG. 10 is a block diagram of an analog front-end processor in a signal processor including a hybrid carrier frequency offset estimator.

FIG. 10 is a simplified block diagram of the analog front-end processor 310 shown on FIG. 9. This processor typically includes a low-noise amplifier 312, to amplify the input signal 32, a down converter 314 to convert the input signal to the intermediate frequency, and an intermediate frequency filter 316 to remove noise and produce the intermediate frequency signal 35. These functional blocks, which are well known in the field of signal processing, will not be further described in this specification.

Figure 11:
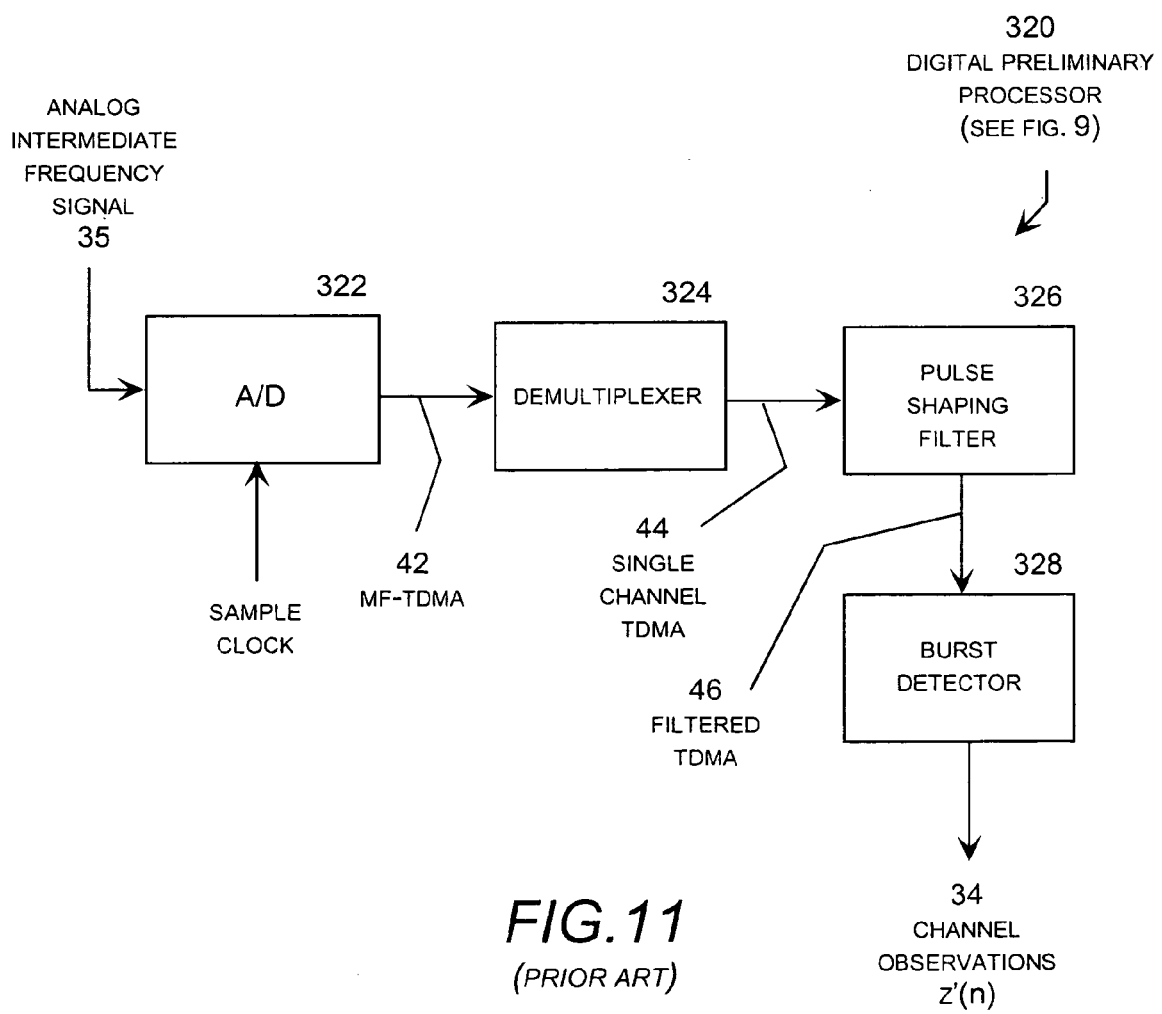
FIG. 11 is a block diagram of a digital preliminary processor a signal processor including a hybrid carrier frequency offset estimator.

FIG. 11 is a block diagram of the digital preliminary processor 320 shown on FIG. 9. This processor includes an analog-to-digital converter 322, which converts the intermediate frequency signal 35 to a digital MF-TDMA signal 42. This signal is passes to a digital demultiplexer 324, which converts the digital MF-TDMA signal 42 into a single-channel TDMA signal 44. This signal is passed to a pulse shaping filter 326, which produces a filtered TDMA signal 46. This signal is passed to a burst detector 328 that detects the start of data bursts and outputs the timing-adjusted channel observation 34. Again, these functional blocks are well known in the field of signal processing and will not be further described in this specification.

Figure 12:
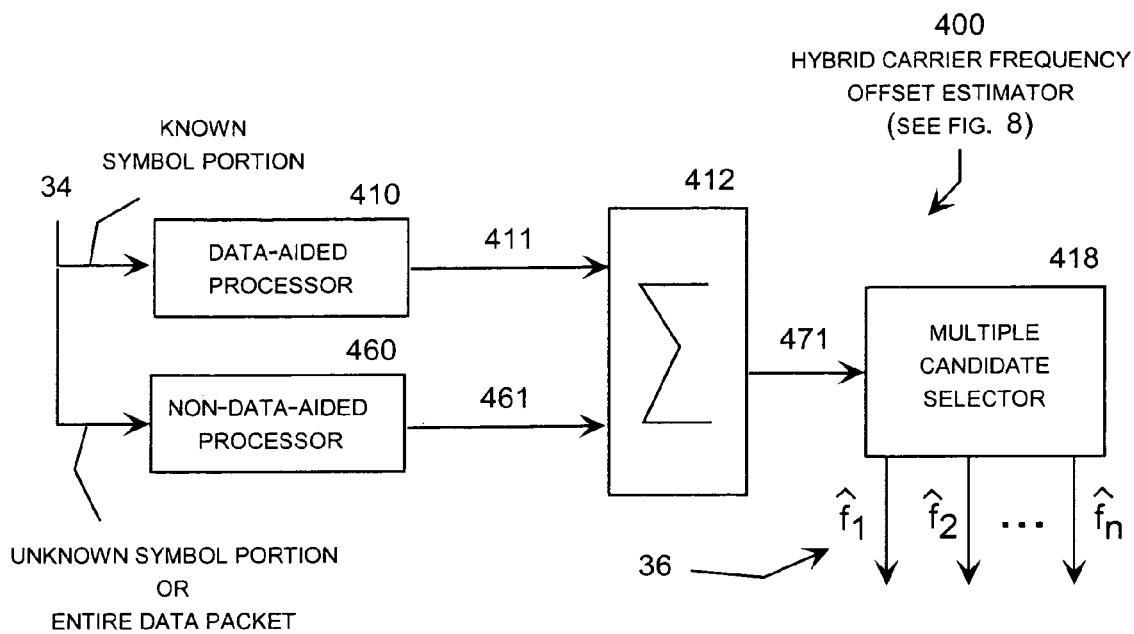
FIG. 12 is a block diagram of a hybrid carrier frequency offset estimator.

FIG. 12 is a block diagram of the hybrid frequency offset estimator 400 shown in FIG. 8. This processor includes a data-aided processor 410 that receives pilot symbols from the channel observation signal 34, and a non-data-, aided processor 460 that receives the unknown data symbols (or all of the data symbols) from the channel observation 34. The data-aided processor 410 produces a scaled data-aided frequency spectrum 411 and the non-data-aided processor 460 produces a scaled non-data-aided frequency spectrum 461. These signals are passed to a combiner 412, which combines data-aided frequency spectrum 411 with the non-data-aided frequency spectrum 461 to produce a combined frequency spectrum 471. This signal is then passed to a multiple candidate selector 418, which analyzes the combined frequency spectrum 471 to produce multiple carrier frequency offset candidates 36, as described previously with reference to FIG. 8.

Figure 13:
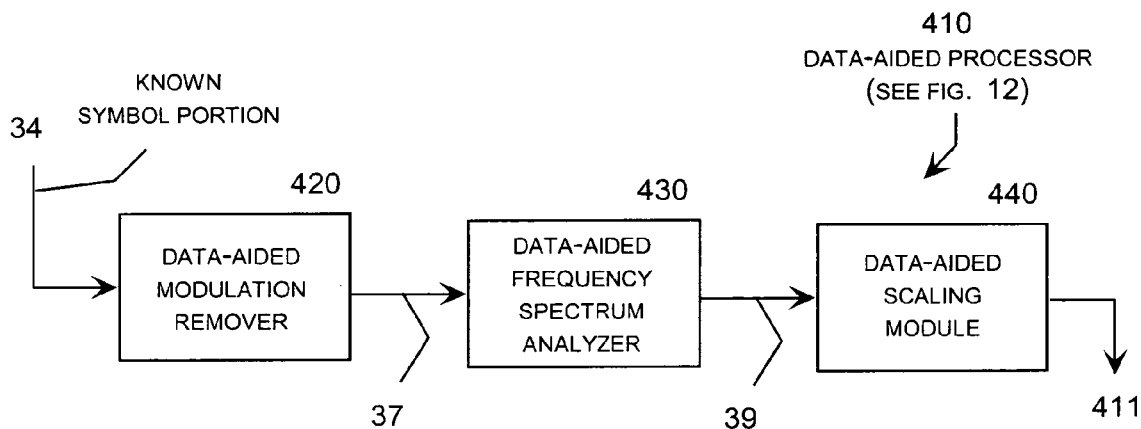
FIG. 13 is a block diagram of data-aided processor in a hybrid carrier frequency offset estimator.

FIG. 13 is a block diagram of the data-aided processor 410 shown in FIG. 12. This processor includes a data-aided data modulation remover 420, which receives the known symbols from the channel observation 34 and removes data modulation from this to produce a data-aided resultant signal 37, in this example a modulation-free representation of the known symbol portion of the channel observation 34. The data-aided resultant signal 37 is then passed to a data-aided frequency spectrum analyzer 430, which produces a data-aided frequency spectrum 39. This signal is then passed to a data-aided scaling module 440, which produces the scaled data-aided frequency spectrum 411, which is passed to the multiple candidate selector 418 shown on FIG. 12.

Figure 14:
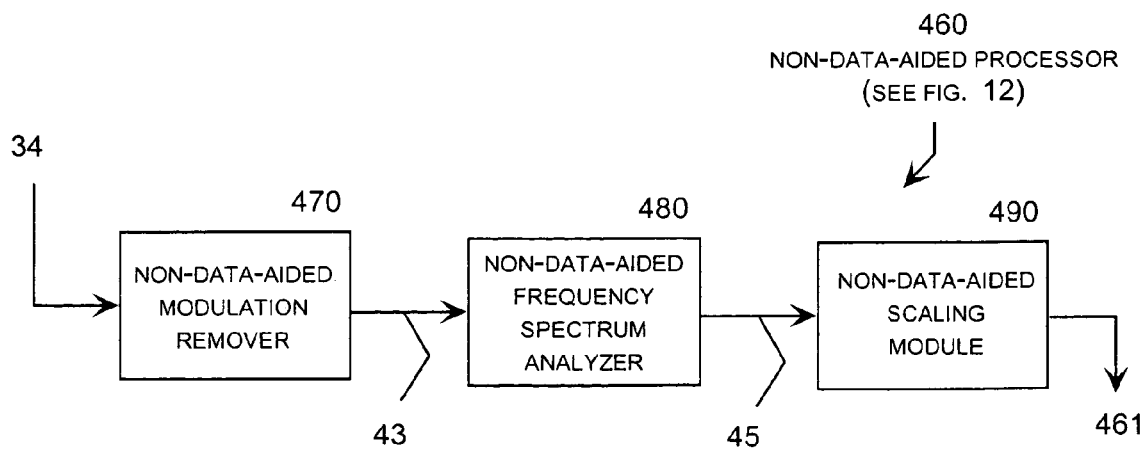
FIG. 14 is a block diagram of non-data-aided processor in a hybrid carrier frequency offset estimator.

FIG. 14 is a block diagram of the non-data-aided processor 460 shown in FIG. 12. This processor includes a non-data-aided data modulation remover 470, which receives the unknown symbols (or all of the symbols) from channel observation 34 and removes data modulation from this to produce a non-data-aided resultant signal 43, in this example a modulation-free representation of the unknown symbol portion (or the entire symbol packet) of the channel observation signal 34. The non-data-aided resultant signal 43 is then passed to a data-aided frequency spectrum analyzer 480, which produces a non-data-aided frequency spectrum 45. This signal is then passed to a non-data-aided scaling module 490, which produces the scaled non-data-aided frequency spectrum 461, which is passed to the multiple candidate selector 418 shown on FIG. 12.

Figure 15:
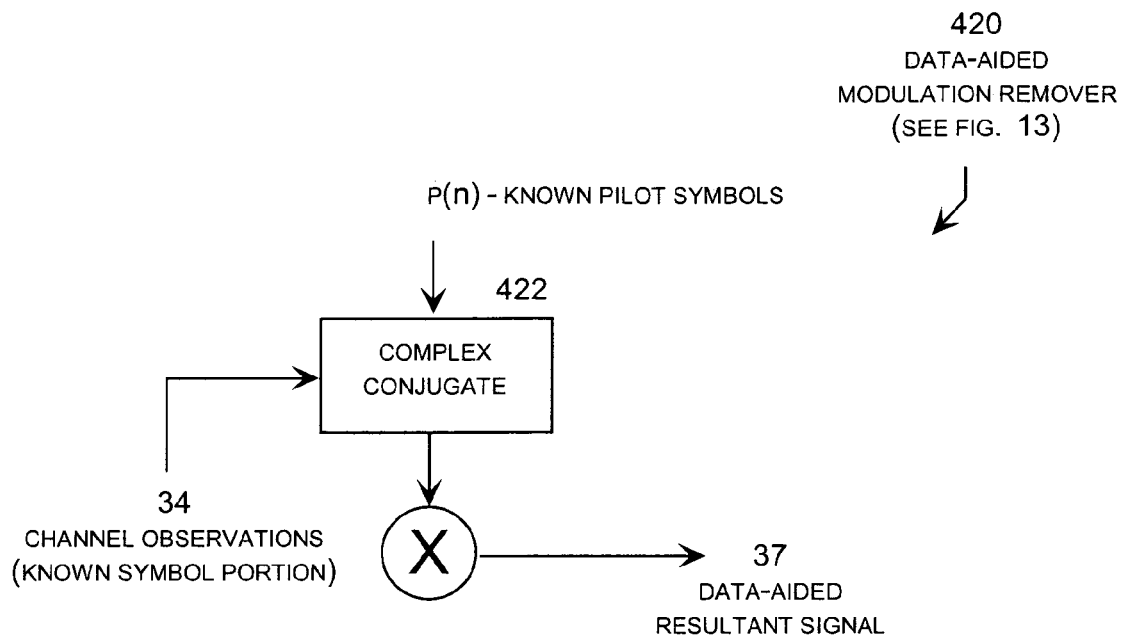
FIG. 15 is a block diagram of a data-aided modulation remover in a hybrid carrier frequency offset estimator.

FIG. 15 is a block diagram of the data-aided modulation remover 420 shown on FIG. 13. This processing block receives the known data symbols (i.e., pilot symbols) from the channel observation 34, which are located in the preamble 80 of the data packet 70 according to the DVB-RCS standard, as shown on FIG. 2. The receiver 60 is also aware of the known pilot symbols P(n), which are defined in advance according to the DVB-RCS standard. The data-aided modulation remover 420 passes the known pilot symbols P(n) to a conjugate processor 422, which determines the complex conjugate of the known pilot symbols P(n), which are multiplied by the known data symbol portion of the channel observation Z'(n) 34. This operation reverses the phase modulation in the channel observation signal Z'(n) 34 to produce data-aided resultant signal 37, which can be thought of as a modulation-free data signal including the frequency offset tone from the known data symbols portion of the channel observation signal Z'(n) 34.

Figure 16:
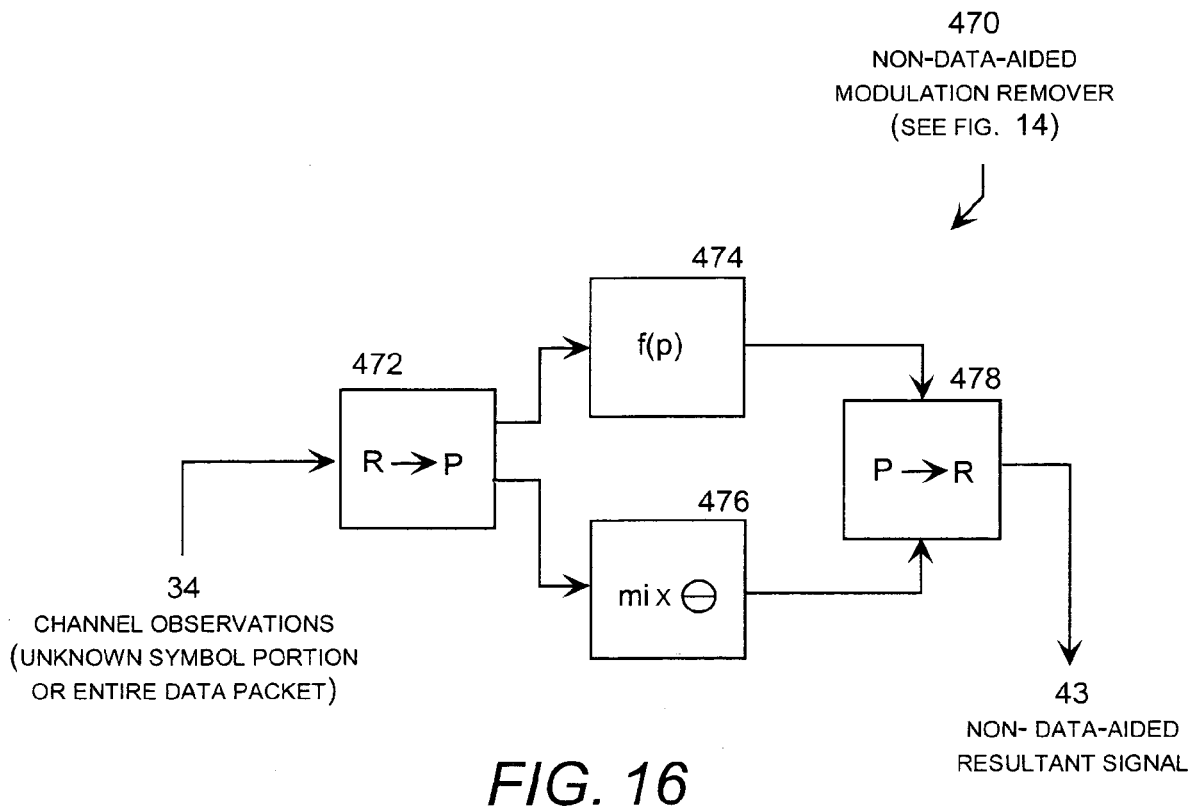
FIG. 16 is a block diagram of a non-data-aided modulation remover in a hybrid carrier frequency offset estimator.

FIG. 16 is a block diagram of non-data-aided modulation remover 470 shown on FIG. 14. This processing block receives the unknown data symbols (or all of the symbols included in the data packet) from the channel observation 34, as shown on FIG. 2. Because the channel observation 34 includes unknown data, the modulation in each symbol cannot be directly reversed. However, the phase value each symbol may be scaled by the modulation index (mi), which represents the number of possible phase states in the modulation scheme, to effectively rotate the phase of each symbol to a common phase value. For the BPSK modulation technique the modulation index is two, for the QPSK modulation technique the modulation index is four, and for the MPSK modulation technique the modulation index is "M." FIG. 16 illustrates processing blocks for performing this operation.

Specifically, the channel observation signal Z'(n) 34 is converted from rectangular to polar form in block 472 to determine the phase angle (Φ)) of each symbol. A function may then be applied to the magnitude (ρ) in block 474. For example, a constant function, a linear function or a squared function can be used to transform the magnitude. More importantly, the phase value of the symbol is multiplied by the modulation index (mi) in block 476, which removes the data modulation from the channel observation signal Z'(n) 34 by effectively rotating every symbol's phase value to a multiple of a common phase orientation. However, this operation also scales the frequency offset by the modulation index (mi), which effect is later reversed to align the data-aided and the non-data aided frequency spectrums (see block 435 shown in FIG. 19 and block 485 shown in FIG. 20, which are cooperatively configured to accomplish this result.) The polar representation of the modulation-free resultant signal (with the modulation index scaling effect present on the carrier offset frequency) is then converted back to rectangular format in block 478.

Figure 17:
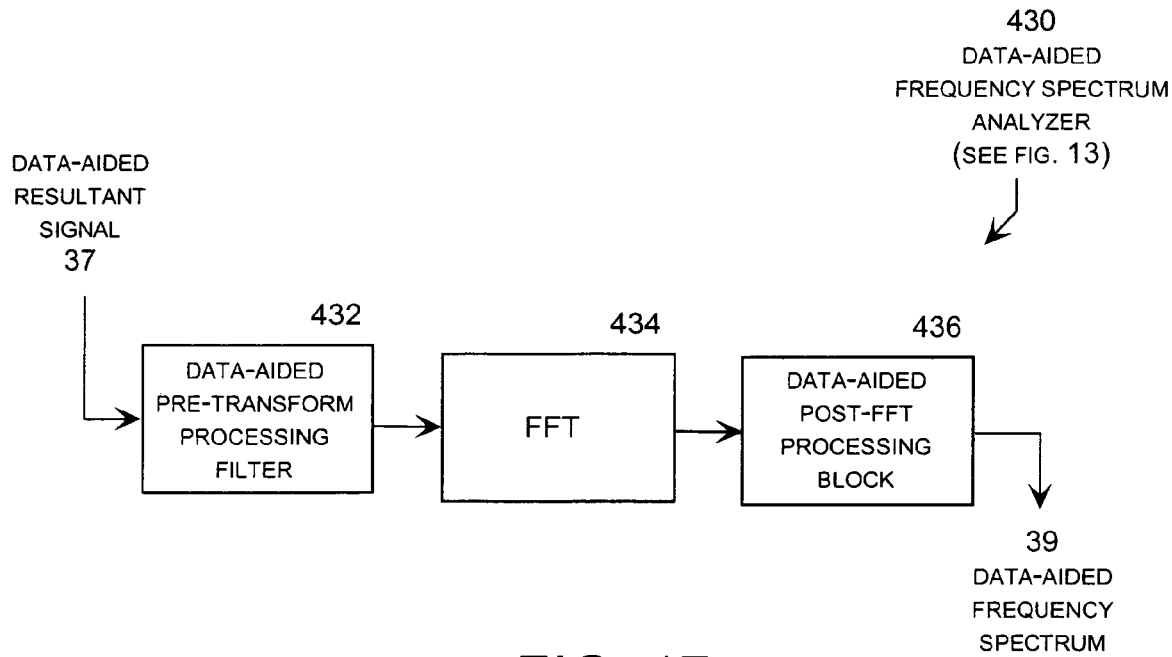
FIG. 17 is a block diagram of data-aided frequency spectrum analyzer in a hybrid carrier frequency offset estimator.

FIG. 17 is a block diagram of data-aided frequency spectrum analyzer 430 shown on FIG. 13. This processor includes a data-aided pre-transform processing filter 432, which receives the data-aided resultant signal 37 from the data-aided modulation remover 420. Recall that the data-aided resultant signal 37 can be thought of as a modulation-free data signal including the frequency offset tone from the known data symbols portion of the channel observation signal Z'(n) 34. The data-aided pre-transform processing filter 432 places the data-aided resultant signal 37 into a format acceptable to the next processor, the FFT block 434, which applies a fast Fourier transform to the filtered data-aided resultant signal to obtain an associated frequency spectrum. The frequency spectrum of the data-aided filtered resultant signal is then passed to a post-FFT processing block 436, which processes this signal to produce the data-aided frequency spectrum 39.

Figure 18:
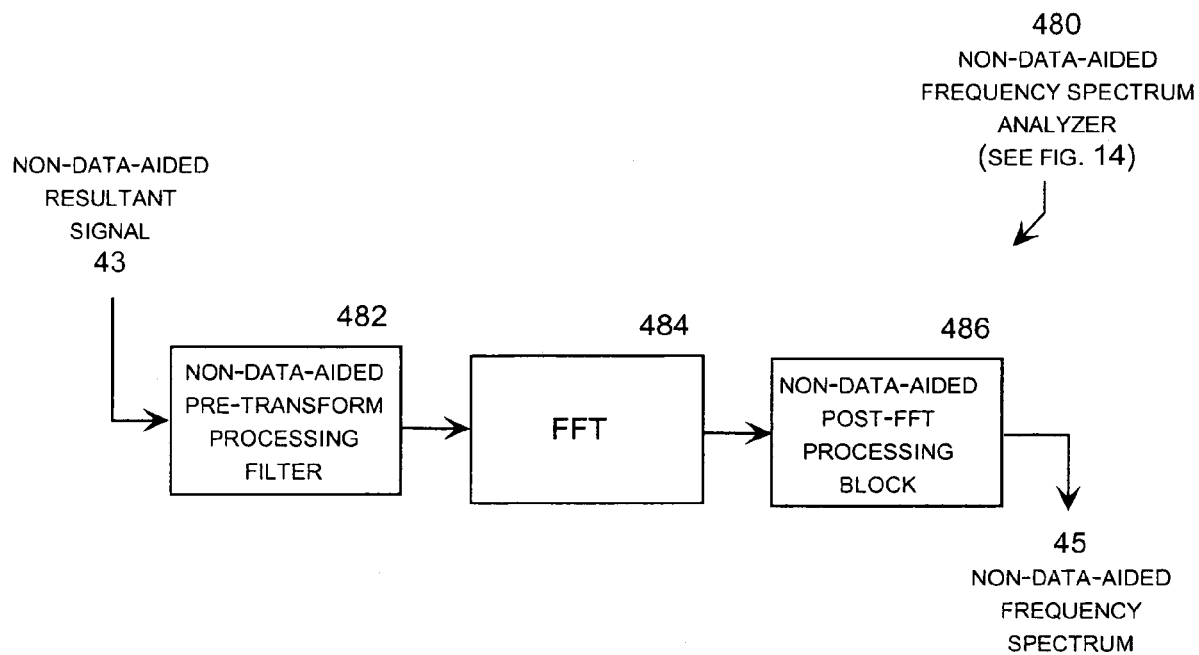
FIG. 18 is a block diagram of non-data-aided frequency spectrum analyzer in a hybrid carrier frequency offset estimator.

FIG. 18 is a block diagram of the non-data-aided frequency spectrum analyzer 480 shown on FIG. 14. This processor includes a non-data-aided pre-transform processing filter 482, which receives the non-data-aided resultant signal 43 from the non-data-aided modulation remover 470. Recall that the non-data-aided resultant signal 43 can be thought of as a modulation-free data signal including the frequency offset tone from the unknown data symbols portion (or the entire data packet) of the channel observation signal Z'(n) 34. The non-data-, aided pre-transform processing filter 482 places the data-aided resultant signal 43 into a format acceptable to the next processor, the FFT block 484, which applies a fast Fourier transform to the filtered non-data-aided resultant signal to obtain an associated frequency spectrum. The frequency spectrum of the filtered non-data-aided resultant signal is then passed to a post-FFT processing block 486, which processes this signal to produce the non-data-aided frequency spectrum 45.

Figure 19:
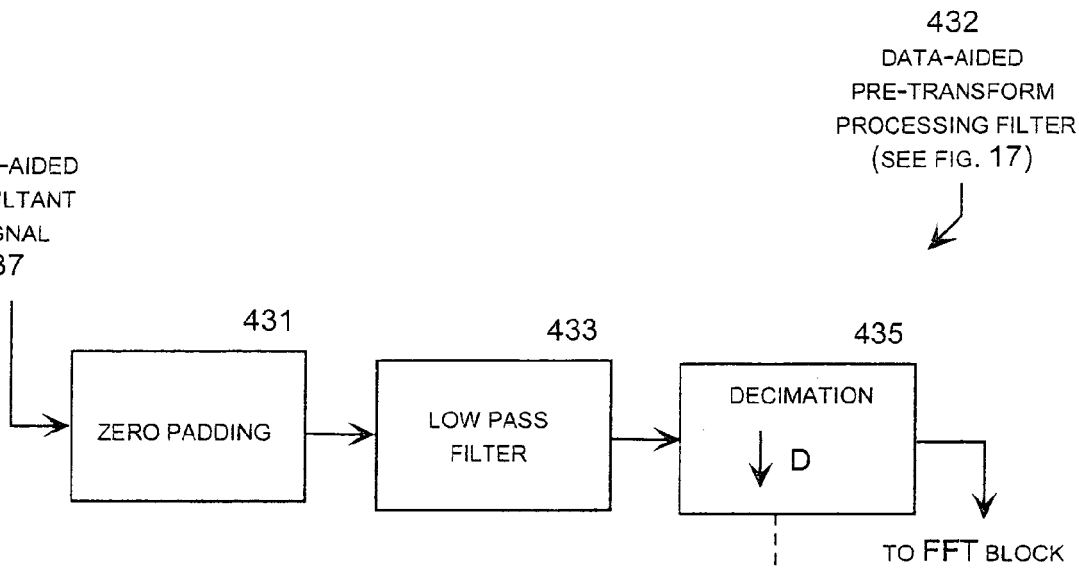
FIG. 19 is a block diagram of a data-aided frequency pre-transform processing filter in a hybrid carrier frequency offset estimator.

FIG. 19 is a block diagram of the data-aided frequency pre-transform processing filter 432 shown-on FIG. 17. This processor receives the data-aided resultant signal 37 from the data-aided modulation remover 420, as shown on FIG. 17. This signal is passed to a zero padding module 431, which sizes the data-aided resultant signal 37 to be the correct size expected by the input buffer of the FFT block 434. The zero-padded data-aided resultant signal is then passed through a low pass filter 433 and on to a data-aided decimation filter 435, which removes over sampling by extracting one of every "D" symbols.

Figure 20:
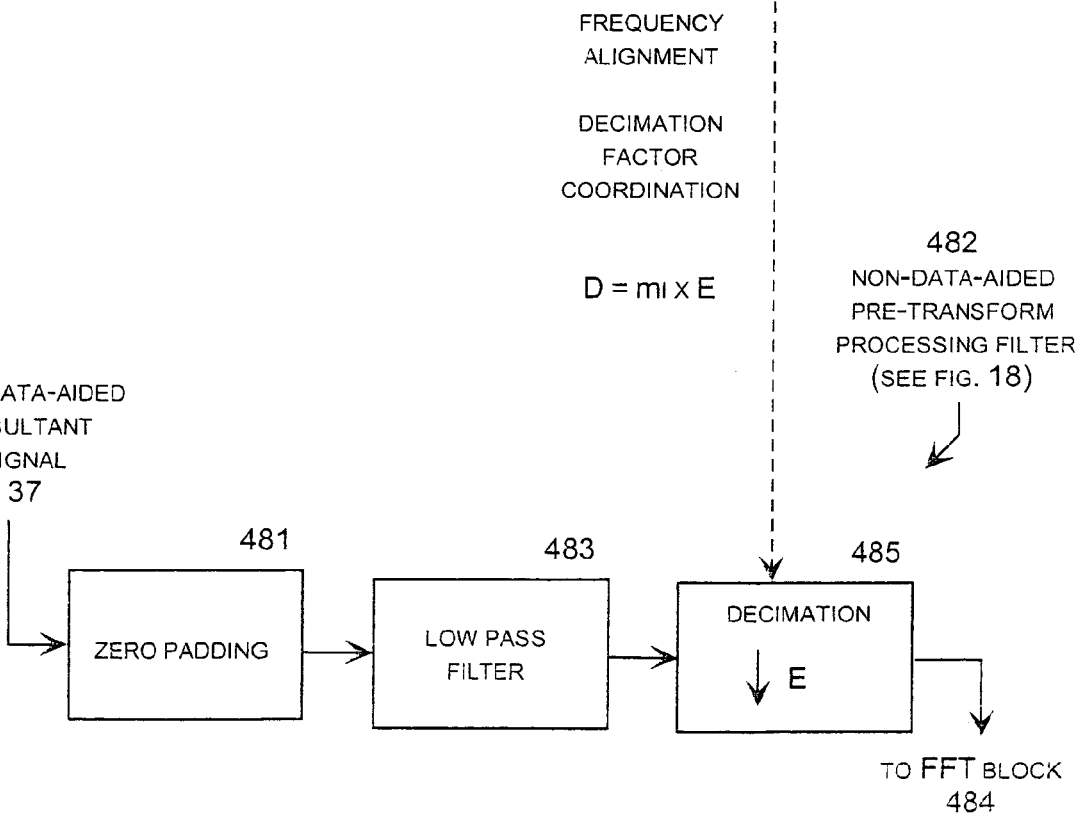
FIG. 20 is a block diagram of a non-data-aided frequency pre-transform processing filter in a hybrid carrier frequency offset estimator.

Similarly, FIG. 20 is a block diagram of the non-data-aided frequency pre-transform processing filter 482 shown on FIG. 18. This processor receives the non-data-aided resultant signal 43 from the data-aided modulation remover 420, as shown on FIG. 18. This signal is passed to a zero padding module 481, which sizes the non-data-aided resultant signal 43 to be the correct size expected by the input buffer of the FFT block 484. The zero-padded data-aided resultant signal is then passed through a low pass filter 483 and on to a non-data-aided decimation filter 485, which reduces the sampling rate of the non-data aided resultant signal 37 by extracting one of every "E" symbols. Here, the data-aided decimation rate "D" is the decimation rate "E" of the non-data-aided decimation filter 485 multiplied by the modulation index, where the modulation index is the factor applied to the phase angle of the non-data-aided symbols in block 476 shown on FIG. 16 for modulation removal. Coordinating the decimation rate "E" applied by the non-data-aided decimation filter 485 with the decimation rate "D" applied by the data-aided decimation filter 435 in this manner (i.e., D=E×mi) removes the effect of the modulation index from the non-data-aided frequency spectrum, and thereby aligns the aligns the frequencies of the data-aided and non-data aided frequency spectrums. This is a specific example of the "frequency alignment" procedure referenced in block 212 of FIG. 7.

Figure 21:
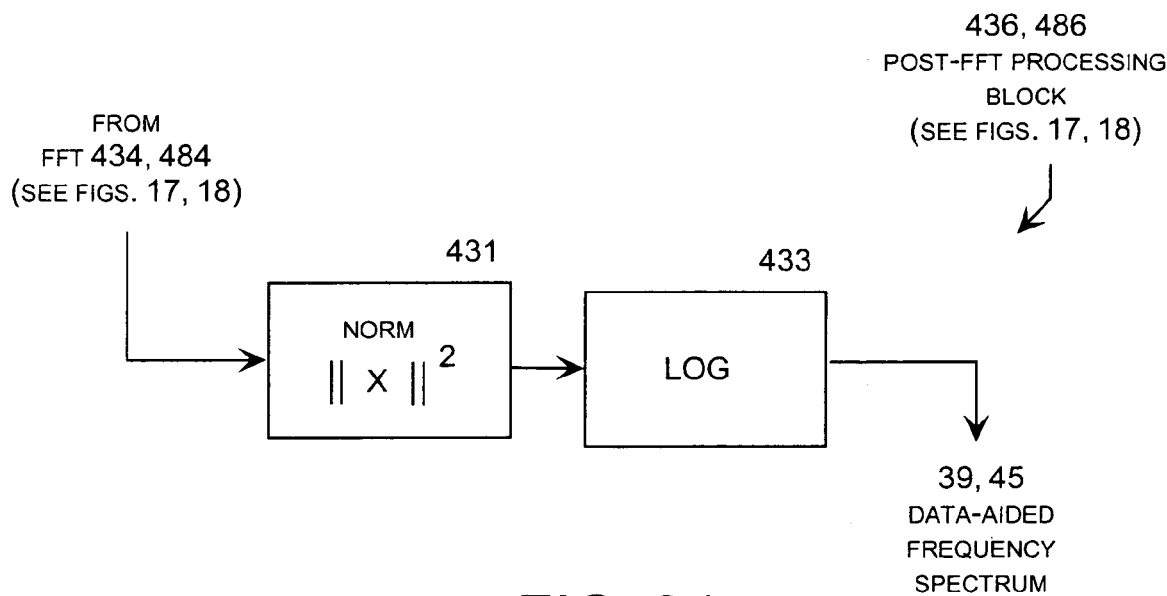
FIG. 21 is a block diagram of a post-FFT processing block in a hybrid carrier frequency offset estimator.

FIG. 21 is a block diagram of the data-aided post-FFT processing block 436 (shown on FIG. 17) and the non-data-aided post-FFT processing block 486 (shown on FIG. 18), which have similar structures. The post-FFT processing block receives the output from the FFT block (434, 484), which is a frequency spectrum representation. This signal is then passed to block 437, which computes the norm squared (i.e., the magnitude squared of each frequency spectrum output of the FFT block), which is a representation of the magnitude of the frequency spectrum. This signal is then converted to the LOG domain in block 439 so that the data aided and non-data-aided frequency spectrums may be combined through an addition step rather than a multiplication step in block 412 shown on FIG. 12. The output from this operation is the data-aided frequency spectrum 39, and the non-data-aided frequency spectrum 45, for the data-aided processor 410 and the non-data-aided processor 460, respectively.

Figure 22:
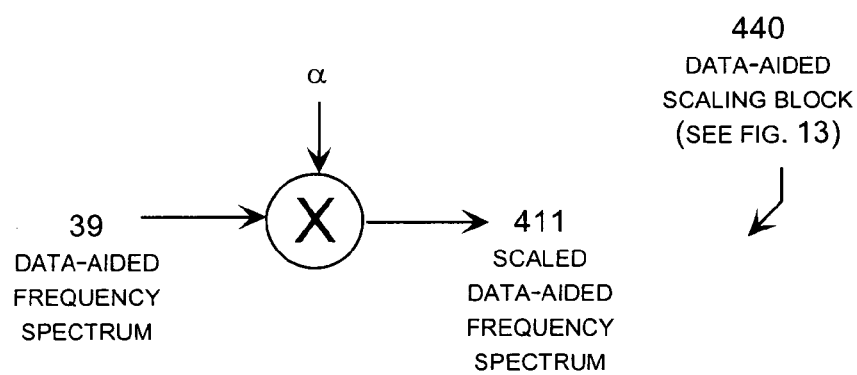
FIG. 22 is a block diagram of a scaling block in a data-aided processor of a hybrid carrier frequency offset estimator.
Figure 23:
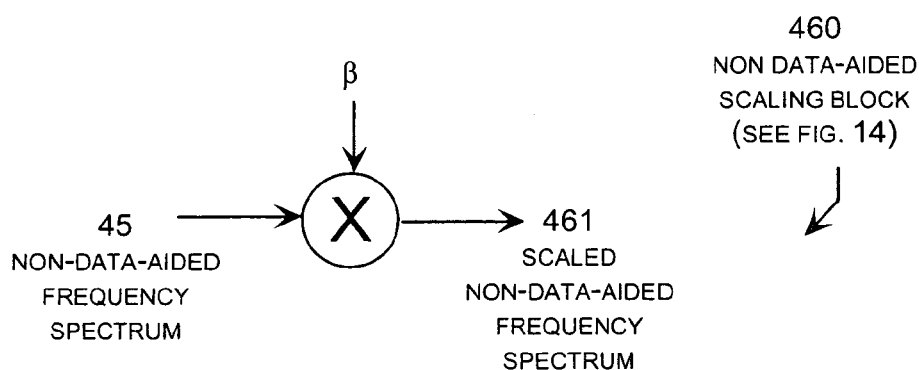
FIG. 23 is a block diagram of a scaling block in a non-data-aided processor of a hybrid carrier frequency offset estimator.

FIG. 22 is a block diagram of the data-aided scaling block 440 shown in FIG. 13. This block multiplies the data-aided frequency spectrum 39 by a scaling factor (α). Similarly, FIG. 23 is a block diagram of the non-data-aided scaling block 490 shown in FIG. This block multiplies the non-data-aided frequency spectrum 45 by a scaling factor (β). Preferably, the scaling factors (α) and (β) can be adjusted independently to provide adjustability in the hybrid frequency offset estimator 400. In addition, the data-aided scaling factor (α) may be set to zero to implement purely non-data-aided processing. Similarly, the non-data-aided scaling factor (β) may be set to zero to implement purely non-data-aided processing. The scaling values (α) and (β) control the contribution of data-aided and non-data aided frequency spectra. Preferred settings for these two parameters depend among other things on the burst size, pilot size and modulation type.

Figure 24:
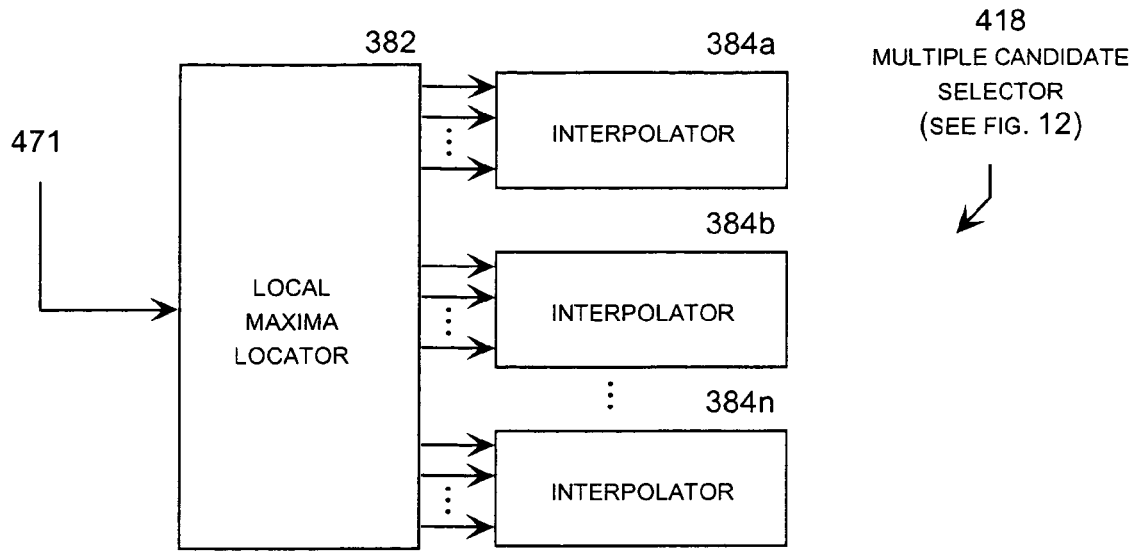
FIG. 24 is a block diagram of a multiple candidate selector in a hybrid carrier frequency offset estimator.
Figure 25:
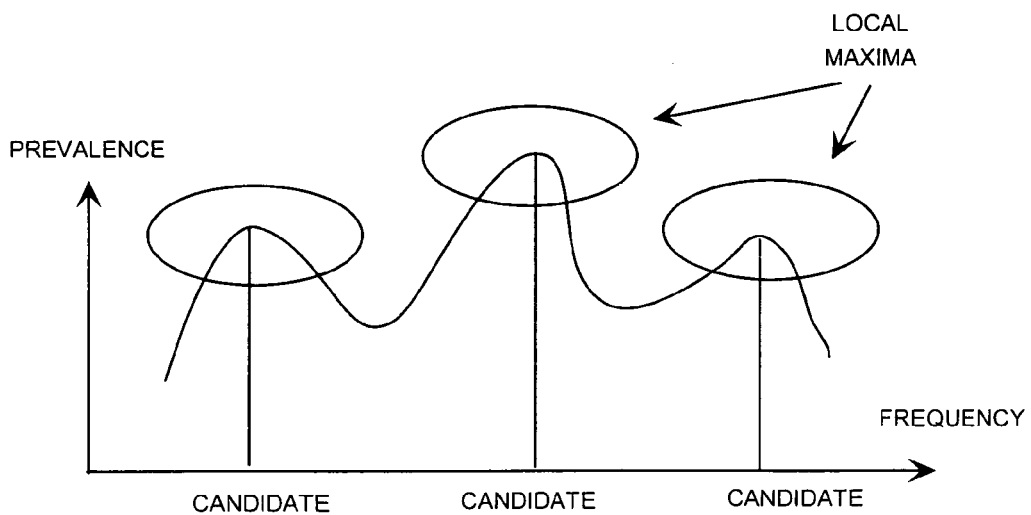
FIG. 25 is a graph depicting local maxima values within a frequency spectrum representation in a hybrid carrier frequency offset estimator.

FIG. 24 is a block diagram of the multiple candidate selector 418 shown on FIG. 12. This processor receives the combined frequency spectrum 471 from the combiner 412. A local maxima locator 382 analyses this signal to locate the "n" largest local maximum values ("n"=three in a preferred embodiment), as shown in FIG. 25. The local maxima locator operates on samples of frequency spectrum generated by FFT process. The local maxima selector can be implemented as an iterative process that identifies the absolute peak of the spectrum as the first candidate. Then the selected peak and its adjacent points (e.g. one or two adjacent points in each side of the selected spectrum) are eliminated and the remaining points are used to select the second absolute peak. This process can continue until all local maxima are selected. The maxima selector as describe here is only an example of how to select the candidates from the frequency spectrum. Other methods for selecting the local maxima can also be applied.

Figure 26:
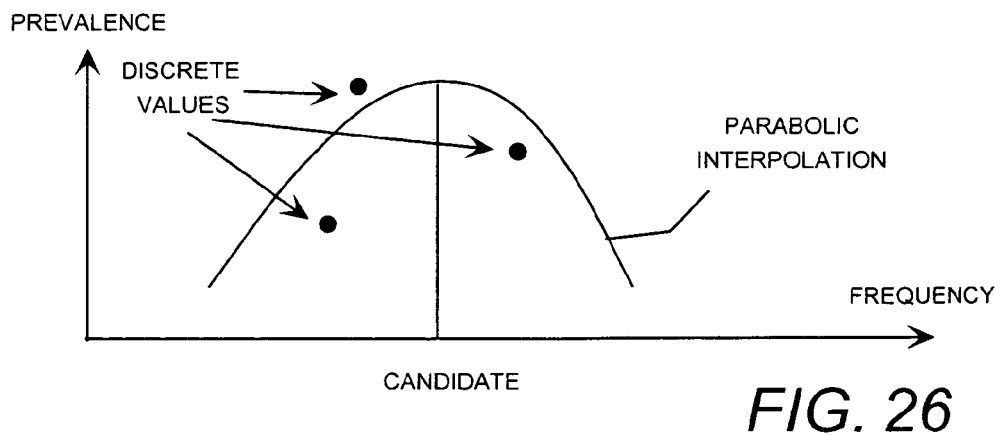
FIG. 26 is a graph depicting interpolation to determine local maxima values in a hybrid carrier frequency offset estimator.

A number of data points corresponding to each local maxima value and its adjacent points are then passed to an interpolation block 384*a-n*, which interpolates a smooth curve through these points to obtain specific local maxima values. For example, a parabolic interpolation technique may be employed to obtain the specific local maxima values, as shown in FIG. 26. These specific local maxima values are then output as the carrier frequency offset candidates 36. As described with reference to FIGS. 2 and 3, the carrier frequency offset candidates 36 are typically expressed as a percentage of the carrier frequency. Carrier frequency offset range depends on the symbol rate of transmitted bursts. For $K_a$ band transmission the carrier frequency uncertainty is with +1800 Hz range. As a result, for a 64 kBaud transmission, the maximum frequency offset is in between −3% to 3% of the symbol rate.

In view of the foregoing, it will be appreciated that present invention provides an improved signal distortion estimator, such as a carrier frequency offset estimator, which may produce multiple signal distortion parameter candidates. The present invention may also be embodied in a hybrid signal distortion estimator that uses data-aided and non-data aided signal processing techniques to identify one or more signal distortion parameter candidates. In particular, a hybrid data-aided and non-data aided carrier frequency offset estimator that produces three carrier frequency offset candidates for a return channel receiver operating in accordance with the DVB-RCS standard is a particularly useful embodiment of the invention.

It should be understood that the foregoing relates only to the exemplary embodiments of the present invention, and that numerous changes may be made therein without departing from the spirit and scope of the invention as defined by the following claims.

The invention claimed is:

1. A signal processor, comprising:
 a channel observer operable for receiving an input signal propagating at an expected carrier frequency experiencing an error offset, the input signal comprising a distorted data signal in which modulating data has been influenced by the error offset, the channel observer further operable for processing the input signal to obtain channel observations for the data signal;
 an error estimator operable for removing modulation from the channel observations to obtain a modulation-free resultant signal comprising a representation of the error offset, obtaining a frequency spectrum representation of the modulation-free resultant signal, processing the frequency spectrum representation of the modulation-free resultant signal to identify multiple error offset candidates, and passing the error offset candidates to a decoder for use in decoding the data signal;
 wherein the error estimator comprises a data-aided processor and a non-data-aided processor each for removing data modulation to obtain the modulation-free resultant signal.

2. The signal processor of claim 1, wherein the error estimator is selected from the group consisting of a carrier frequency offset estimator and phase angle offset estimator.

3. The signal processor of claim 1, wherein the channel observer further comprises a front-end analog processor operable for amplifying the input signal, down-converting the amplified input signal to obtain an intermediate frequency signal, and filtering the intermediate frequency signal.

4. The signal processor of claim 1, wherein:
 the input signal comprises burst-mode multi-frequency time division multiplexed (MF-TDMA) data in which the data signal is encoded using a quadrature phase shift key (QPSK) modulation technique in accordance with the digital video broadcast return channel via satellite (DVB-RCS) standard; and
 the channel observer further comprises a digital preliminary processor operable for digitizing a representation of the input signal to obtain a digital MF-TDMA signal, demultiplexing the MF-TDMA signal to obtain a concatenated single-channel TDMA signal, and detecting burst-mode data packets within the single-channel TDMA signal to obtain the channel observations.

5. The signal processor of claim 1, wherein the error estimator identifies the error offset candidates by identifying multiple local maxima values in the frequency spectrum representation of the modulation-free resultant signal.

6. The signal processor of claim 1, wherein the channel observations comprise symbols having phase components representing data.

7. The signal processor of claim 6, wherein the data-aided processor comprises a modulation remover that removes data modulation from known symbols within the channel observations by multiplying the known symbols in the channel observations with conjugate representations of the known symbols to cancel phase modulation due to the known symbols.

8. The signal processor of claim 6, wherein the non-data-aided processor comprises a modulation remover that removes data modulation from unknown symbols within the channel observations by scaling the phase components of the unknown symbols by a modulation index to cancel the phase components of the unknown symbols.

9. The signal processor of claim 1, wherein the error estimator obtains the frequency spectrum representation of the modulation-free resultant signal using a Fast Fourier Transform (FFT) technique.

10. A signal processor, comprising:
 a channel observer operable for receiving an input signal propagating at an expected carrier frequency experiencing an error offset, the input signal comprising a distorted data signal in which modulating data has been influenced by the error offset, the channel observer further operable for processing the input signal to obtain channel observations for the data signal;
 an error estimator operable for removing modulation from the channel observations to obtain a modulation-free resultant signal comprising a representation of the error offset, obtaining a frequency spectrum representation of the modulation-free resultant signal, processing the frequency spectrum representation of the modulation-free resultant signal to identify at least one error offset candidate, and passing the error offset candidates to a decoder for use in decoding the data signal;
 wherein the error estimator comprises a data-aided processor operable for processing known data elements in the channel observations to obtain a data-aided frequency spectrum representation comprising a modulation-free representation of the error offset associated with the known data elements, a non-data-aided processor operable for processing unknown data elements in the channel observations to obtain a non-data-aided frequency spectrum representation comprising a modulation-free representation of the error offset associated with the unknown data elements, and a combiner for combining the data-aided and non-data-aided frequency spectrum representations.

11. The signal processor of claim 10, wherein the data-aided and non-data-aided frequency spectrum representations are converted to a LOG domain, independently scaled, and summed to obtain the frequency spectrum representation of the modulation-free resultant signal.

12. The signal processor of claim 11, wherein the data-aided and non-data-aided frequency spectrum representations are independently scaled to allow adjustment within the frequency estimator.

13. The signal processor of claim 12, wherein a scaling factor for either the data-aided or the non-data-aided processor may be independently set to zero or a non-zero value and thereby allow the signal processor to switch between purely data-aided, purely non-data-aided, and hybrid processing modes.

14. The signal processor of claim 10, wherein the data-aided and non-data-aided processors are frequency aligned to facilitate combining the data-aided and non-data-aided frequency spectrum representations.

15. The signal processor of claim 14, wherein the channel observations include symbols having phase components representing data, and wherein:
the data-aided processor comprises a modulation remover that removes data modulation from known symbols within the channel observations by multiplying the known symbols in the channel observations with conjugate representations of the known symbols to cancel the phase components of the known symbols;
the non-data-aided processor comprises a modulation remover that removes data modulation from the unknown symbols within the channel observations by scaling the phase components of the unknown symbols by a modulation index to cancel the phase components of the unknown symbols;
the data-aided processor comprises a data-aided pre-transform processing filter;
the non-data-aided processor comprises a non-data-aided pre-transform processing filter; and
the data-aided pre-transform processing filter and the non-data-aided pre-transform processing filter are cooperatively configured to align the data-aided and non-data-aided frequency spectrum representations.

16. The signal processor of claim 15, wherein:
the data-aided pre-transform processing filter comprises a data-aided decimation filter operating at a data-aided decimation rate;
the non-data-aided pre-transform processing filter comprises a non-data-aided decimation filter operating at a non-data-aided decimation rate; and
the non-data-aided decimation rate is substantially equal to the data-aided decimation rate multiplied by the modulation index to align the data-aided and non-data-aided frequency spectrum representations.

17. The signal processor of claim 10, wherein the error estimator identifies the error offset candidates for the channel observations by identifying a maximum values in the frequency spectrum representation of the modulation-free resultant signal.

18. The signal processor of claim 10, wherein:
the data-aided processor comprises a data-aided modulation removal module, a data-aided frequency spectrum module, and a data-aided scaling module; and
the non-data-aided processor comprises a non-data-aided modulation removal module, a non-data-aided frequency spectrum module, and a non-data-aided scaling module.

19. The signal processor of claim 10, wherein the input signal comprises burst-mode multi-frequency time division multiplexed (MF-TDMA) data in which the data signal is encoded using a quadrature phase shift key (QPSK) modulation technique in accordance with the digital video broadcast return channel via satellite (DVB-RCS) standard.

20. The signal processor of claim 19, wherein the channel observer further comprises a front-end analog processor operable for amplifying the input signal, down-converting the amplified input signal to obtain an intermediate frequency signal, and filtering the intermediate frequency signal.

21. The signal processor of claim 20, wherein the channel observer further comprises a digital preliminary processor operable for digitizing the filtered intermediate frequency signal to obtain a digital MF-TDMA signal, demultiplexing MF-TDMA signal to obtain a concatenated single-channel TDMA signal, and detecting burst-mode data packets within the single-channel TDMA signal to obtain the channel observations.

22. A signal processor, comprising:
a channel observer operable for receiving an input signal propagating at an expected carrier frequency experiencing an error offset, the input signal comprising a distorted data signal in which modulating data has been influenced by the error offset, the channel observer further operable for processing the input signal to obtain channel observations for the data signal;
an error estimator operable for removing modulation from the channel observations to obtain a modulation-free resultant signal comprising a representation of the error offset, obtaining a frequency spectrum representation of the modulation-free resultant signal, processing the frequency spectrum representation of the modulation-free resultant signal to identify multiple error offset candidates, and passing the error offset candidates to a decoder for use in decoding the data signal;
wherein the error estimator comprises a data-aided processor operable for processing known data elements in the channel observations to obtain a data-aided frequency spectrum representation comprising a modulation-free representation of the error offset associated with the known data elements, a non-data-aided processor operable for processing unknown data elements in the channel observations to obtain a non-data-aided frequency spectrum representation comprising a modulation-free representation of the error offset associated with the unknown data elements, and a combiner for combining the data-aided and non-data-aided frequency spectrum representations.

23. The signal processor of claim 22, wherein the data-aided and non-data-aided processors are frequency aligned to facilitate combining the data-aided and non-data-aided frequency spectrum representations.

24. The signal processor of claim 23, wherein the input signal comprises burst-mode multi-frequency time division multiplexed (MF-TDMA) data in which the data signal is encoded using a quadrature phase shift key (QPSK) modulation technique in accordance with the digital video broadcast return channel via satellite (DVB-RCS) standard.

25. The signal processor of claim 24, wherein the channel observer further comprises a front-end analog processor operable for amplifying the input signal, down-converting the amplified input signal to obtain an intermediate frequency signal, and filtering the intermediate frequency signal.

26. The signal processor of claim 25, wherein the channel observer further comprises a digital preliminary processor operable for digitizing the filtered intermediate frequency signal to obtain a digital MF-TDMA signal, demultiplexing MF-TDMA signal to obtain a concatenated single-channel TDMA signal, and detecting burst-mode data packets within the single-channel TDMA signal to obtain the channel observations.

27. The signal processor of claim 26, wherein the frequency estimator obtains the data-aided and non-data-aided frequency spectrum representations using a Fast Fourier Transform (FFT) technique.

28. A signal processor, comprising:
 a channel observer operable for obtaining channel observations for an input signal comprising distorted data;
 an error estimator comprising a data aided processor and a non-data-aided processor each for removing modulation from the channel observations to obtain a modulation-free resultant signal;
 a data-aided signal distortion analyzer operable for processing known data elements in the resultant signal to obtain a data-aided signal distortion indicator;
 a non-data-aided signal distortion analyzer operable for processing unknown data elements in the resultant signal to obtain a non-data-aided signal distortion indicator;
 a combiner for combining the data-aided and non-data-aided signal distortion indicators to obtained a combined signal distortion indicator.

29. The signal processor of claim 28, further comprising a signal distortion candidate selector for processing the combined signal distortion indicator to identify multiple candidates for a parameter associated with the signal distortion.

30. A signal processor, comprising:
 a channel observer operable for obtaining channel observations for an input signal comprising a distorted data signal in which modulating data has been influenced by unknown distortion, the channel observer further operable for processing the input signal to obtain channel observations for the data signal; and
 a signal distortion candidate estimator operable for removing modulation using data-aided and non-data-aided processing techniques from the channel observations to obtain a modulation-free resultant signal comprising a representation of the distortion, processing the resultant signal to identify multiple candidates for a parameter associated with the signal distortion, and passing the candidates to a decoder for use in decoding the data signal.

31. A method for operating a signal processor of a burst-mode data input signal exhibiting a low signal-to-noise ratio, comprising the steps of:
 removing modulation from the data input signal to obtain a modulation-free resultant signal using data-aided and non-data-aided processing techniques;
 applying data-aided and non-data-aided signal processing techniques to the resultant signal to create a combined signature representing a signal distortion parameter associated with the data input signal; and
 analyzing the combined signature to identify multiple candidate values for the signal distortion parameter and passing the multiple candidates to a decoder for use in decoding the data signal.

32. In or for a signal processor of a burst-mode data input signal operating at a carrier frequency experiencing carrier frequency offset and exhibiting a low signal-to-noise ratio, an improvement comprising:
 a carrier frequency offset estimator operable for removing modulation from the data input signal using data-aided and non-data-aided processing techniques to obtain a modulation-free resultant signal and applying data-aided and non-data-aided signal processing techniques to the resultant signal to obtain a combined frequency spectrum comprising a representation of a carrier frequency offset associated with the data input signal; and
 a multiple peak selector operable for identifying multiple carrier frequency offset candidates by identifying local maxima values in the combined frequency spectrum representation.

* * * * *